US011170300B2

(12) United States Patent
Dalli et al.

(10) Patent No.: US 11,170,300 B2
(45) Date of Patent: Nov. 9, 2021

(54) EXPLAINABLE NEURAL NET ARCHITECTURE FOR MULTIDIMENSIONAL DATA

(71) Applicant: UMNAI Limited, Ta' Xbiex (MT)

(72) Inventors: Angelo Dalli, Floriana (MT); Mauro Pirrone, Kalkara (MT); Matthew Grech, San Gwann (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/155,299

(22) Filed: Jan. 22, 2021

(65) Prior Publication Data
US 2021/0232915 A1 Jul. 29, 2021

Related U.S. Application Data

(60) Provisional application No. 62/964,850, filed on Jan. 23, 2020.

(51) Int. Cl.
*G06N 3/08* (2006.01)
*G06K 9/62* (2006.01)
*G06N 3/04* (2006.01)

(52) U.S. Cl.
CPC .............. *G06N 3/08* (2013.01); *G06K 9/623* (2013.01); *G06N 3/049* (2013.01)

(58) Field of Classification Search
CPC ........ G06N 3/08; G06N 3/0454; G06N 3/063; G06N 5/003; G06N 5/022
USPC ......................................................... 706/25
See application file for complete search history.

(56) References Cited

U.S. PATENT DOCUMENTS 7,697,765 B2  4/2010  Matsugu et al.
9,811,775 B2  11/2017  Krizhevsky et al.
(Continued)

FOREIGN PATENT DOCUMENTS

CN    108154194 A    6/2018
CN    109784489 A    5/2019
(Continued)

OTHER PUBLICATIONS

Jiangfan Feng et al., "Bag of Visual Words Model with Deep Spatial Features for Geographical Scene Classification", Computational Intelligence and Neuroscience, vol. 2017, Article ID 5169675, Jun. 19, 2017, 14 pages.
(Continued)

*Primary Examiner* — Jeffery A Williams
(74) *Attorney, Agent, or Firm* — Maier & Maier, PLLC

(57) ABSTRACT

An exemplary embodiment may describe a convolutional explainable neural network. A CNN-XNN may receive input, such as 2D or multi-dimensional data, a patient history, or any other relevant information. The input data is segmented into various objects and a knowledge encoding layer may identify and extract various features from the segmented objects. The features may be weighted. An output layer may provide predictions and explanations based on the previous layers. The explanation may be determined using a reverse indexing mechanism (Backmap). The explanation may be processed using a Kernel Labeler method that allows the labelling of the progressive refinement of patterns, symbols and concepts from any data format that allows a pattern recognition kernel to be defined allowing integration of neurosymbolic processing within CNN-XNNs. The optional addition of meta-data and causal logic allows for the integration of connectionist models with symbolic logic processing.

6 Claims, 15 Drawing Sheets

(56) References Cited

U.S. PATENT DOCUMENTS

| | | | |
|---|---|---|---|
| 9,965,705 | B2 | 5/2018 | Chen et al. |
| 10,762,894 | B2 | 9/2020 | Sainath et al. |
| 2016/0328630 | A1 | 11/2016 | Han et al. |
| 2020/0143005 | A1* | 5/2020 | Nair .................... G06F 16/9027 |
| 2020/0342304 | A1 | 10/2020 | Chu et al. |

FOREIGN PATENT DOCUMENTS

| | | |
|---|---|---|
| CN | 108154222 B | 8/2020 |
| CN | 108320017 B | 8/2020 |
| WO | 2016/150472 A1 | 9/2016 |

OTHER PUBLICATIONS

Alexander Binder et al., "Layer-wise Relevance Propagation for Neural Networks with Local Renormalization Layers", arXiv:1604.00825v1 [cs.CV], Apr. 4, 2016, 8 pages.

Aravindh Mahendran et al., "Visualizing deep convolutional neural networks using natural pre-images", arXiv:1512.02017v3 [cs.CV], Apr. 14, 2016, 25 pages.

David Alvarez-Melis et al., "Towards Robust Interpretability with Self-Explaining Neural Networks", 32nd Conference on Neural Information Processing Systems (NeurIPS 2018), Montréal, Canada, 10 pages.

Russell Reed et al., "Regularization Using Jittered Training Data", IEEE, 1992, 6 pages.

Anh Nguyen et al., "Multifaceted Feature Visualization: Uncovering the Different Types of Features Learned by Each Neuron in Deep Neural Networks", arXiv:1602.03616v1 [cs.NE], Feb. 11, 2016, 23 pages.

Amirata Ghorbani et al., "Towards Automatic Concept-based Explanations", 33rd Conference on Neural Information Processing Systems (NeurIPS 2019), Vancouver, Canada, 10 pages.

Roy Assaf et al., "MTEX-CNN: Multivariate Time series EXplanations for Predictions with Convolutional Neural Networks", IEEE, 2019, 6 pages.

* cited by examiner

Figure 3B

EXPLAINABLE NEURAL NET ARCHITECTURE FOR MULTIDIMENSIONAL DATA

CROSS-REFERENCE TO RELATED APPLICATIONS

The present patent application claims benefit and priority to U.S. Patent Application No. 62/964,850, filed on Jan. 23, 2020, which is hereby incorporated by reference into the present disclosure.

FIELD

A method for integrating convolutional layers into explainable neural networks (XNNs) and explainable machine learning models may be shown and described.

BACKGROUND

Artificial intelligence (AI) has outperformed humans in numerous areas. Despite this success, AI may still be prone to mistakes just as humans are. However, due to the black-box nature of modern AI systems, these mistakes may be difficult to identify and detect. As a result, a method of explaining the reasoning behind an AI's conclusions is needed in the field.

One of the most prominent applications of AI technology has been in image, video, and speech recognition. These fields often implement convolutional neural networks, or CNNs, which take advantage of the hierarchical pattern in data and assemble more complex patterns using smaller and simpler patterns. CNNs implement convolution in at least one of their layers in place of general matrix multiplication.

CNNs can efficiently process and analyze large scale images, whereas a traditional multilayer perceptron model may suffer in terms of accuracy and performance due to the full connectivity between nodes. CNNs can also take into account the spatial structure of the input data, treating input pixels which are closer together different than those that are farther apart.

However, the input and outputs of a convolutional layer may be masked due to the convolution and the activation function, and therefore may be hidden layers. Thus, CNNs are black-box models which cannot explain a conclusion, classification, or output.

The creation of various neural network architectures has been heavily researched in order to solve various problems with better model performance, but very limited research has been done on architectures which are interpretable and explainable, eliminating the need to apply post-hoc methods for interpretability. Lack of explainability can restrict the adoption of new AI applications in decision-critical applications such as autonomous driving and the medical industry.

The lack of understanding within neural networks has limited some of its potential uses. It may be difficult for an analyst or an engineer to explain the relationships between the input and corresponding output of a black-box neural network. Since a neural network could have multiple layers and neurons, it may be impossible to identify which functions occur through the neural network to produce the output.

Recent developments on methods relating to rule extraction from AI methods have attempted to explain the predictions of black-box models in a post-hoc manner. Post-hoc methods often focus on posteriori explanations, where interpretations are derived locally with limited access to the inner workings of the model such as with gradients. Alternatively, they may implement oracle queries to estimate simpler models that capture the local input-output behavior.

Unless the model is already trained, SENN (Melis and Jaakkola, 2018) proposes a method which enables the architecture of a neural network to have built-in interpretability in a bottom-up approach. SENN enables point-wise local explanations which are achieved through a regularization scheme that ensures that the model not only looks like a linear model but also behaves like a linear model (locally). In such a scheme, data points which are close to each other should have similar coefficients.

A SENN consists of three components: a concept encoder that transforms the input into a small set of interpretable basis features, an input-dependent parametrizer that generates relevance scores, and an aggregation function that combines these scores to produce a prediction. The robustness loss on the parametrizer encourages the full model to behave locally as a linear function on h(x) with parameters θ(x), yielding immediate interpretation of both concepts and relevancies.

SENN explanations differ from typical explanation methods. Concept based explanations may provide traditional input-based explanations. In a SENN, the description of each concept is provided with an explanation. For instance, in a prediction, certain concepts or features may be more important than others.

Layer-wise relevance propagation (LRP) (Binder et al., 2016) is a method which identifies which neurons contribute most to the top layer by running a backward pass in the neural network. The backward pass computes a relevance distribution value, where neurons that contribute the most receive the highest score. Similar to XNNs, LRP may be used to generate a heatmap depicting the most important features in the original input. Unlike XNNs, LRP is considered a post-hoc explanation method since the explanation is not generated as part of the output but computed as a separate step through the backward pass process.

Automatic concept-based explanations (ACE) (Ghorbani et al., 2019) are capable of automatically extracting visual concepts. This method works by aggregating related local image segments across diverse data. ACE takes a trained classifier and a set of images of a class as input. It then extracts concepts present in that class and returns each concept's importance. In image data, concepts are present in the form of groups of pixels (segments). To extract all concepts of a class, the first step of an ACE is to capture the complete hierarchy of concepts, from simple fine-grained ones like textures and colors to more complex and coarse-grained ones such as parts and objects, by segmenting each image with multiple resolutions. The second step of an ACE groups similar segments as examples of the same concept. The last step of an ACE includes returning important concepts from the set of extracted concepts in previous steps. ACE utilizes the testing with concept activation vectors (TCAV) score as a concept's importance metric. The intuition behind the TCAV score is to approximate the average positive effect of a concept on predicting the class and is generally applied to deep neural network classifiers. Given examples of a concept, TCAV score is the fraction of class images for which the prediction score increases if the representation of those images in the activation space are perturbed in the general direction of representation of concept examples in the same activation space (with the use of directional derivatives).

The work in (Feng et al., 2017) proposes a method that utilizes Convolutional Neural Networks (CNNs) as a feature extractor to learn the visual vocabularies for spatial Bag of Visual Words (BoVW). The work in (Feng et al., 2017) uses the final convolutional layer in a CNN architecture, with dimensions H×W×F, as an F-dimensional descriptors, where H and W are the height and width of the feature maps and F refers to the number of feature maps. The F-dimensional descriptors are used as input to the spatial BoVW model. The generated descriptions of the images are used as input to the machine learning classifier for scene classification.

SUMMARY

According to at least one exemplary embodiment, a method, system and apparatus for a convolutional explainable neural network may be shown and described.

Explainable neural networks (XNN) are a new type of artificial neural network (ANN) which may include a combination of linear models (prediction network) combined with rules (conditional network). In various exemplary embodiments, a globalized model may be formed from a combination of multiple of these partitions. XNNs can be used both to predict values (regression) and for classification.

Convolutional XNNs (CNN-XNNs) allow convolutional layers to be seamlessly integrated into XNNs for processing images, 3D data and other signals that are amenable to convolutional feature identification, transformation, and extraction. Various exemplary embodiments of CNN-XNN-implementing systems may thus be capable of processing any multidimensional matrix or array data. CNN-XNNs may stack the convolutional layers prior to the general XNN architecture. In other words, the output from the convolutional layers may become the input of the general XNN architecture. The XNN may combine multiple local models into one global model. Local models may analyze a specific concept which may include similar items.

CNN-XNN and ACE both have the same objective, which is to identify the most important concepts for a given input sample, although CNN-XNNs aim to go beyond simple identification and provide a structured explanation for input data. The main difference between ACE and CNN-XNNs is that CNN-XNNs consist of a single combined network for partitioning and value predictions, which is also used for scoring the concepts and providing explanations, while ACE requires extra components in addition to a neural network. Another main advantage of CNN-XNNs over ACE is that the CNN-XNN architecture is fully white-box which enables the explainability not just of the key concepts, but also of the key symbols and kernels along the entire network via the reverse indexing mechanism (Backmap).

Typically, when an image is analyzed in a local manner, a linear or non-linear model may be sufficient to explain the model. On the other hand, global models may illustrate the model with a holistic view. XNNs may merge the two—multiple partitions (or concepts) may represent the local zones and multiple linear or non-linear models may explain each partition, which may be combined to create a global model. XNNs may go beyond linear data and may cater to non-linear data by embedding transformations (such as polynomial transformations) within the neural network itself, while still retaining explainability. Each layer, neuron, and connection within an XNN has a precise and well known and understandable function, unlike standard ANNs that are a black-box. XNNs are thus the first ever known fully white-box ANNs, giving rise to a new category of neural networks that are understandable and interpretable. CNN-XNNs preserve the white-box properties of XNNs and extend it to convolutional operations, enabling explainability to be added to CNN based systems.

The novel Kernel Labeler method within convolutional explainable AI models labels the progressive refinement of patterns, symbols and concepts from any data format that allows a pattern recognition kernel to be defined, together with a suitable key point description function and an activation maximization function.

An exemplary embodiment may implement a Kernel Labeling method which differs from the work in (Feng et al., 2017) by instead utilizing a bag of visual words (BoVW) method for all deep convolutional layers, not only on the final convolutional layer as in (Feng et al., 2017). An exemplary embodiment may use Activation Maximization of the respective filter for deep convolutional layers, instead of using the feature map as in (Feng et al., 2017). An exemplary Kernel Labeling method may label the progressive refinement of patterns, symbols and concepts located in the convolutional layers in a CNN or CNN-XNN architecture, whereas the work in (Feng et al., 2017) uses the extracted descriptors for classification purposes.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 3B is an exemplary embodiment of an inverse indexing mechanism (Backmap) for pooling layers with weight distribution.

DETAILED DESCRIPTION

Figure 1:
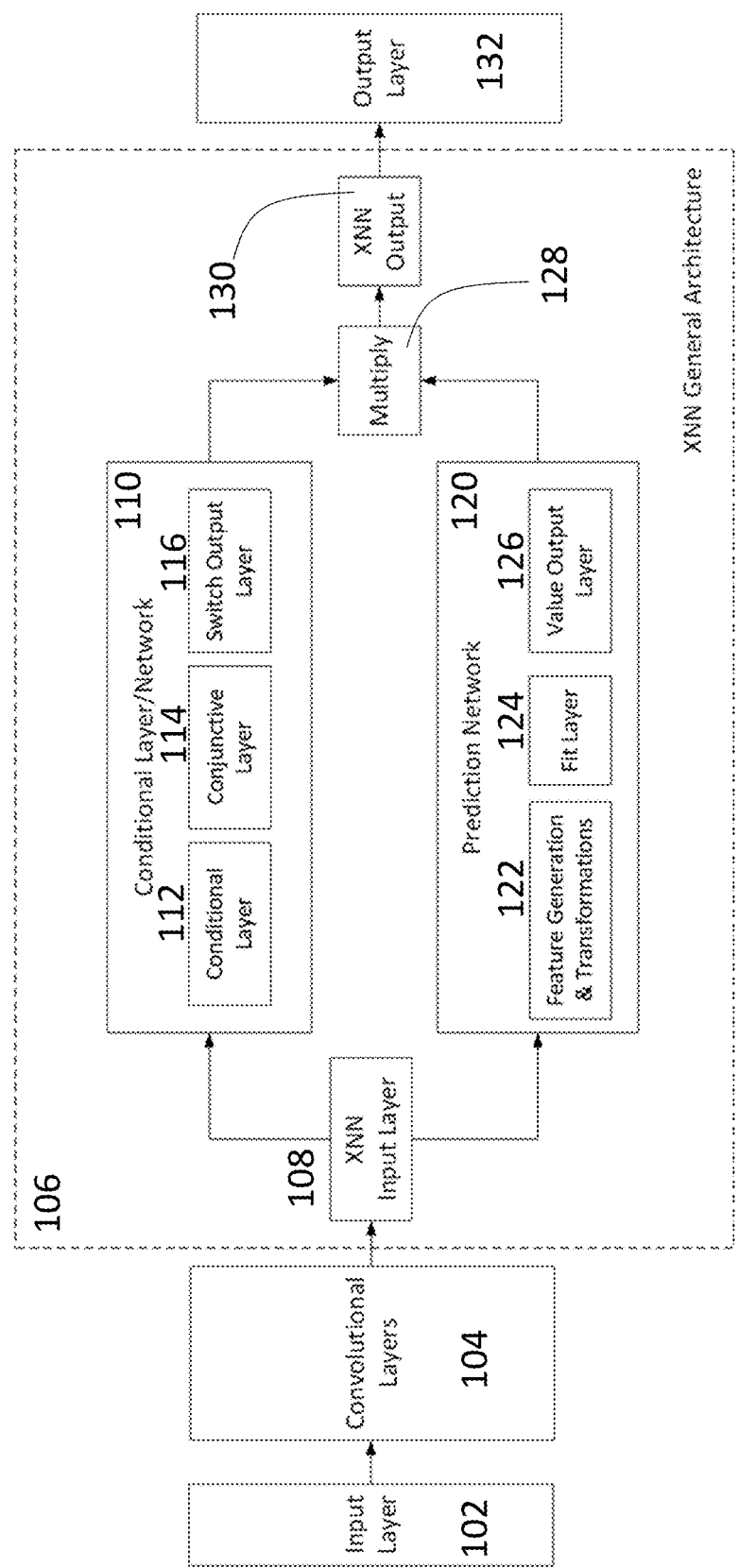
FIG. 1 is an exemplary embodiment of a high-level CNN-XNN architecture.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Convolutional XNNs may combine one or more convolutional layers with the general architecture of XNNs. An exemplary CNN-XNN may be formed from different architectures, depending on the need and use case.

It may be contemplated that one or more convolutional layers may be combined with other explainable architectures including, but not limited to, eXplainable artificial intelligence (XAI) models, Interpretable Neural Nets (INNs), eXplainable Neural Nets (XNN), eXplainable Reinforcement Learning (XRL), eXplainable Spiking Nets (XSN), and eXplainable Memory Nets (XMN) models. A further exemplary embodiment may also combine one or more convolution layers with eXplainable AutoEncoders and Decoders (XAED), and eXplainable Generative Adversarial Networks (XGAN). Although some examples may reference one or more of these specifically (for example, only XNN), it may be contemplated that any of the embodiments described herein may be applied to XAIs, INNs, XNNs, XTTs, XRLs, XSNs, XMNs, XAEDs, or XGANs interchangeably. It may be further contemplated that any of the embodiments described herein may be applied to the causal (C-XNN) and fast (F-XNN) variants of XNNs and other explainable architectures such as XAI models, INNs, XTTs, XRLs, XSNs, XMNs, XAEDs, XGANs, and other suitable architectures.

Referring now to exemplary FIG. 1, FIG. 1 may illustrate a high-level architecture of an exemplary CNN-XNN. An exemplary basic architecture of a CNN-XNN may combine a number of convolutional layers with the general XNN architecture. The CNN-XNN may begin with an input layer 102, which may provide for various input data to be received by the system, such as an input image, video, or historical record and the like. Data points received by input layer 102 may contain feature data in various formats including but not limited to 2D or 3D data, such transactional data, sensor data, image data, natural language text, video data, audio, haptic, LIDAR data, RADAR, SONAR, and the like. Data points may have one or more associated labels which indicate the output value or classification for a specific data point. Data points may also result from an internal and/or external process that outputs a combination of synthetic data points, perturbed data, sampled data, or transformed data. Data points may also be organized in a temporal manner, such that the order of the data points denote a specific sequence. It is further contemplated that input layer 102 may receive a combination of training data, validation data, test data, holdout data, real-time data, or batch data. It is further contemplated that the input layer 102 may receive raw or transformed output from a combination of another neural network, machine learning system, explainable machine learning model, or suitable combination of internal or external systems. Next, a convolutional network 104 may be implemented, which may feed data to the XNN 106.

The input layer 102 may include execution stages for various pre-processing steps. For example, the input layer 102 may include raw data, which may in some exemplary embodiments include 2D images or some form of other 2D/3D or higher dimensional data which can be modelled using convolutional layers. The input is convoluted by breaking down and identifying various elements within the input. There may be multiple channels of data corresponding to different sensors. For example, in color images, there may be three separate channels corresponding to red, green, and blue channels. In another exemplary embodiment, depth sensor information may be embedded as a fourth channel in the input data matrix. For other applications, like LIDAR, RADAR, stereoscopic vision, or multiple-sensor fusion applications, the input may be multi-dimensional data. After the input is convoluted, the convoluted data may be processed to extract features, symbols and concepts which can be loaded as an input to an XNN general architecture. Conceptually, this may consist of data transformation, dimensionality reduction and/or space reduction to make the implementation of a CNN-XNN more practical. Alternatively, the input may be convoluted in a sparse coding approach, using methods such as a Deconvolution layer, to learn features, symbols and concepts which can be loaded as an input to an XNN general architecture.

In an exemplary embodiment using image processing, it may be contemplated to process several images in the input layer 102. The input images may be of high or low resolution. In an exemplary embodiment, the input image resolution could be of 8K resolution. Although image data in theory could be processed as flat list of features, the convolution process 104 may reduce the dimensionality of images into a form which is easier to process without losing the most important features. Once the features have been convoluted, the final list of features may be flattened, which can then serve as input to the XNN.

Flattening in this context refers to the mechanism used to reshape the data. For example, a 28×28 input data row may be flattened to a list of features with 784 features. In an exemplary general architecture, an XNN may take a flat list of features as input. These input features may contain higher level features extracted by the convolutional layer together with some of the original multi-dimensional input data, depending on the specific application. Image data and other multi-dimensional data may generate a huge list of features when dimensionally reduced or otherwise flattened, even at fairly low resolution. For this reason, convolutional layers are used to compress the data while still retaining the most important features. Image-data for both black-box models and CNN-XNNs may be processed directly by a standard XNN without any convolutional layers, but in some practical applications, this may not be a feasible solution. In general, in order to implement a practical and resource efficient transfer to multi-dimensional data into a format compatible with the XNN, one or more dimensionality reduction and/or data transformation operations may be required. Dimensionality reduction operations such as pooling, skip connections, and the like may be used in various practical implementations and generally preserve both translational invariance and translation equivariance. Additional dimensionality reduction operations such as: (i) relevance path by agreement-based methods used in Capsule Networks, (ii) identity connections and stochastic depth used in Highway Networks and Residual Networks, (iii) and densely connected layers used in Dense CNNs, may all be used within a CNN-XNN. Data transformation operations such as flatten, transposition, sampling, and so on are typically used in various practical implementations. The precise dimensionality reduction operation used may determine whether the resulting combined system remains fully white-box or gets converted to a grey-box. In an exemplary embodiment, any combination of dimensionality reduction methods compatible with the CNN-XNN reverse indexing mechanism (Backmap) may result in a white-box implementation. It may be contemplated that new computing architectures, such as neuromorphic computing, may reduce or remove the need for dimensionality reduction and/or data transformation operations, as XNNs implemented on such architectures may be able to process the multi-dimensional data directly in a resource efficient and practical manner.

Each neuron in the dimensionality reduced layer or data transformation layer (such as flattened layer) may represent a feature in an exemplary XNN architecture. In a typical black-box CNN, the network may include a number of fully connected dense layers after the convolutional process. However, in a CNN-XNN, the network may be based on an XNN network which may replace the dense (fully connected) layers of the black-box CNN. With such an architecture, important inner convoluted features or filters can be identified for the generated result. The weights of the XNN model (or the coefficients of the rules in a rule-based model), may indicate the importance of the convoluted features.

In an exemplary embodiment, XNNs may be used to recognize hand-written digits. The first step in the process of creating such an XNN may be to identify the partitions using a suitable clustering or hierarchal partitioning method, such as an XAI model induction method which uses training data as input to a model and analyzes the output to identify rules and partitions. The input to the partitioning method can be either the input features directly for low-dimensional data (i.e., tabular) or data which has been pre-processed (for example, from a convolutional network). Features which have been transformed using a convolutional process may represent a higher-level of abstraction such as an edge, a stroke, or a pattern. These level-of abstractions may be processed using multiple applications of convolution kernels or filters. Although image data may be modelled as a flat list of pixels, a convolutional process may be applied in order to reduce the dimensionality of the data while retaining the most important features. This increases the efficiency and accuracy of a neural network.

Still referring to the hand-written digits example, convoluted features may include patterns of various numbers at different level of abstraction. Through appropriate partitioning, similar features (or concepts) may then be grouped together according to the partition logic. For example, in one embodiment, various patterns or variations of the number 2 may be grouped together in one partition. Further, another partition may be created to represent the number 1 and number 7 together, since they contain similar features. A more fine-grained partition may immediately separate the two numbers. Other variations on this process may of course be contemplated in other embodiments.

Given a specific input sample (e.g., image of number 7), a CNN-XNN may perform the following steps:

In an optional first step, the input image may be convoluted to higher-level abstracted features. The feature data (or transformed feature data) is then filtered to determine which partition to activate. In an exemplary case, the partition which distinguishes between 1 and 7 is selected.

Next, the prediction network may then rank the features in the convolutional network within the activated partition only. For example, in one exemplary case, the prediction network may determine that the convolutional filter which detects horizontal lines is the most important and may be used to classify the resulting output as number 7. The importance information may also be used to explain the classification. The prediction network may automatically correct for scale or rotational variances using non-linear methods, if they exist in the examples.

The XNN 106 may receive the output of the convolutional layer 104 in an XNN input layer 108. The XNN input layer 108 may be inputted, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction output layer (value output) 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output layer 132.

The processing of the conditional network 110 and the prediction network 120 is contemplated to be in any order. Depending on the specific application of the XNN, it may be contemplated that some of the components of the conditional network 110 like components 112, 114 and 116 may be optional or replaced with a trivial implementation. Depending on the specific application of the XNN, it may further be contemplated that some of the components of the prediction network 120 such as components 122, 124 and 126 may be optional or replaced with a trivial implementation.

Figure 2A:
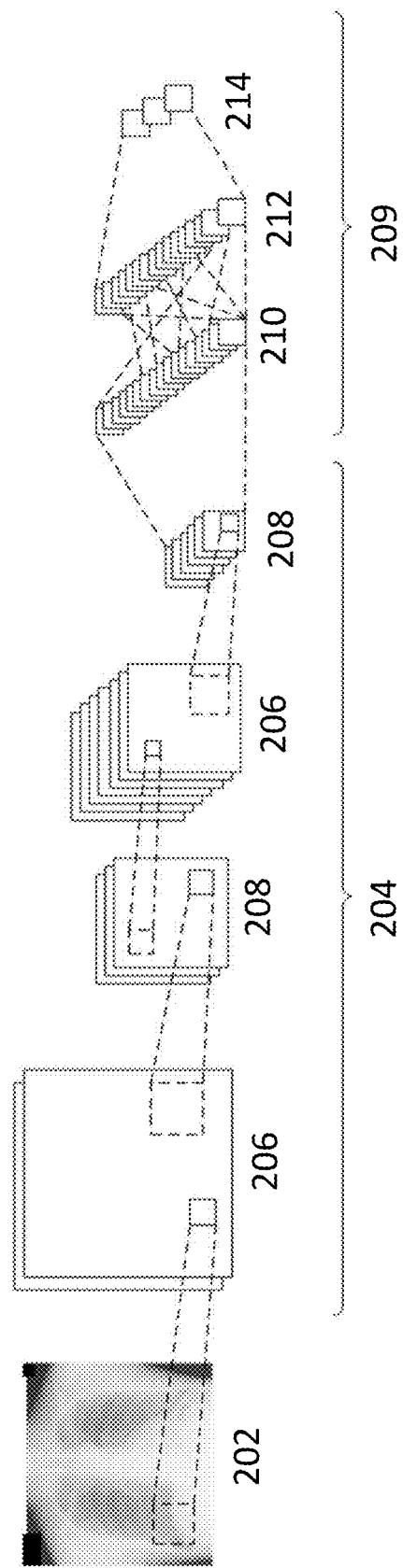
FIG. 2A is an exemplary embodiment of a black-box CNN architecture (Prior Art).
Figure 2B:
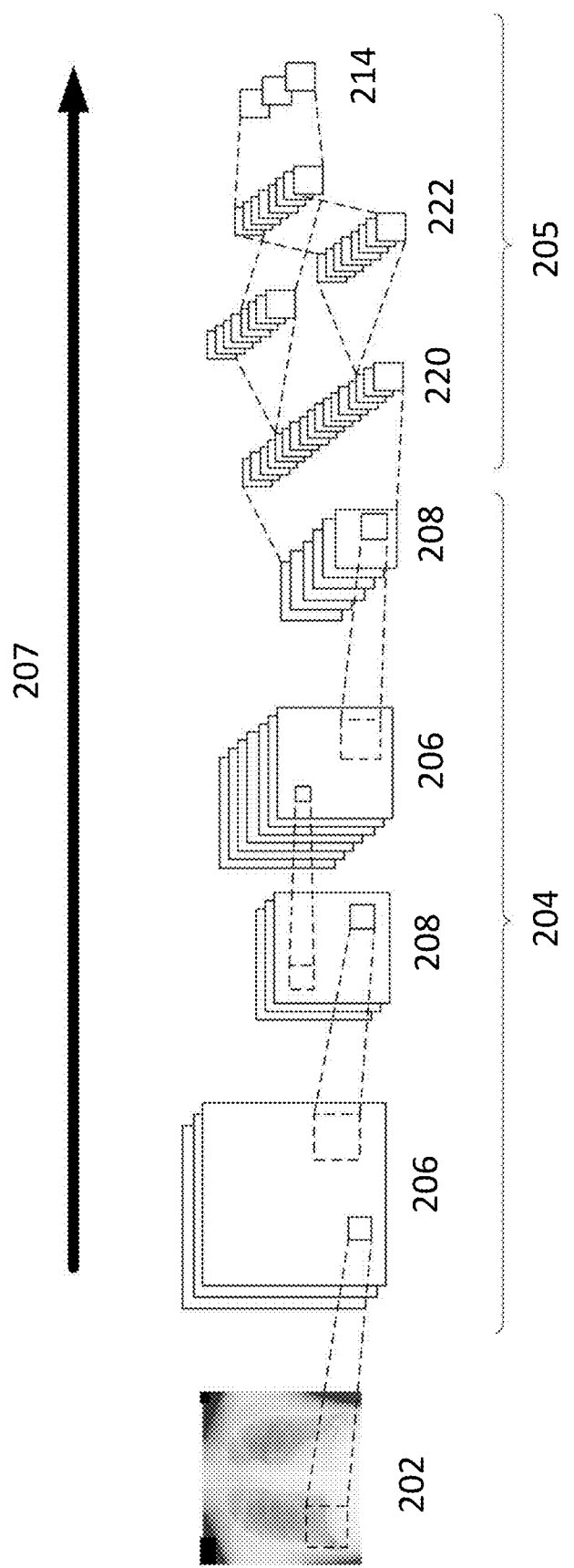
FIG. 2B is an exemplary embodiment of a forward passing CNN-XNN architecture.

FIG. 2A and FIG. 2B show the difference between a black-box CNN and a white-box CNN-XNN, respectively. One of the main differences between a standard black-box CNN (FIG. 2A) and a white-box CNN-XNN (FIG. 2B) is that the CNN fully connected layer 212 is replaced with an XNN network 222. The steps between 202 and 210 may remain the same. First, the CNN layer may receive an input

202. The input 202 is then convoluted using the CNN Layers 206, where different elements of the input are extracted and categorized. Next, the convoluted layers are pooled or grouped 208 based on similar features. The pooled features could be again convoluted and pooled. In this exemplary embodiment illustrated in FIG. 2A and FIG. 2B, the CNN layer performs the convolution 206 twice and the pooling 208 twice, however it may be contemplated that additional repetitions of these layers may be implemented, depending on the application. After the CNN layers convolute and pool the convoluted features, in the case of FIG. 2A, the uninterpretable sub-symbolic representations 210 may be dimensionally reduced or otherwise transformed or flattened after the sequence of convolution 206 and pooling 208 ends (i.e. when the process reaches the end of the CNN layer 204) for input into the next part of the classification system 209. In the case of an exemplary CNN-XNN architecture as shown in FIG. 2B, the concepts layer 220 in the CNN layers 204, may be dimensionally reduced or otherwise transformed or flattened for input into the next part of the classification system 205. The concepts layer 220 may refer to interpretable sub-symbolic representations and may be linked to concepts related methods such as the Kernel Labeler. FIG. 2A illustrates a CNN architecture which implements a fully connected layer 212, which may classify the convoluted and dimensionally reduced input to produce an output 214 that, in an exemplary medical application, classifies the input into three classes: 'Normal', 'Bacterial Pneumonia' or 'Viral Pneumonia'. FIG. 2B illustrates a CNN-XNN architecture which implements an XNN 222 which produces the output 214 and may additionally produce an explanation. The actual configuration of such steps may depend on the configuration of the specific CNN network. CNNs, similar to tabular datasets, make use of fully-connected layers in order to learn patterns in the data. The other CNN layers are simply feature transformation steps which occur prior to the classification task. A similar concept is applied with CNN-XNN, whereby such CNN transformations may be applied prior to the general XNN.

Pooling layers are standard layers found in CNN networks that may reduce the overall dimensionality and/or space taken up by the data in a neural network. They are typically placed after a convolutional layer, where a convolution layer provides a summary of the features in an image or some form of multi-dimensional data. The main issue with convolutional layers is that they are sensitive to the location of the input features. This means that small variations in the input data may result in a different feature map. One approach is to down sample the data where low resolution of the same data is used for further processing. One method for down sampling in a CNN network is called pooling. Pooling makes use of an operator to reduce the size of the feature map. Two common pooling methods are Max and Average Pooling. For example, max pooling may be used to calculate the maximum or largest value from a feature map.

Additional dimensionality reduction operations such as: (i) relevance path by agreement-based methods used in Capsule Networks, (ii) identity connections and stochastic depth used in Highway Networks and Residual Networks, (iii) and densely connected layers used in Dense CNNs, may all be used within a CNN-XNN as alternatives that may compliment and/or replace pooling.

The reverse indexing mechanism (Backmap) is something unique to the CNN-XNN architecture which is possible due to the white-box nature of CNN-XNNs. Since all layers are white-box, including the CNN layers, it is possible to apply reverse indexing in order to backtrack the output all the way to the original input.

Figure 3A:
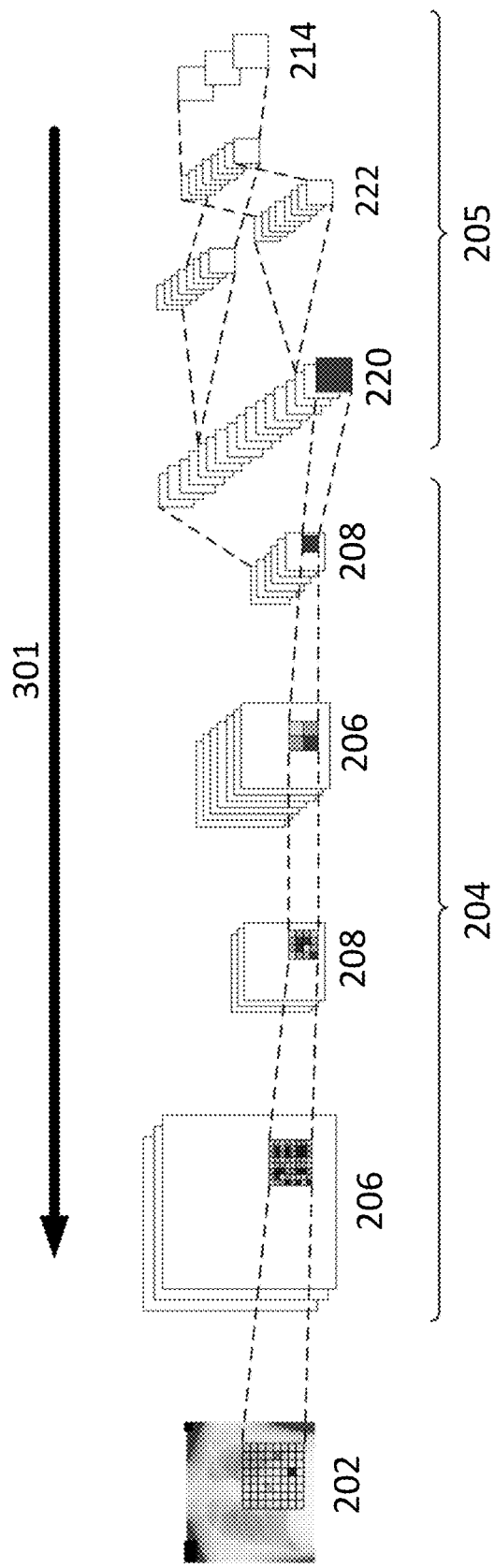
FIG. 3A is an exemplary embodiment of an inverse indexing mechanism (Backmap).
Figure 3B:
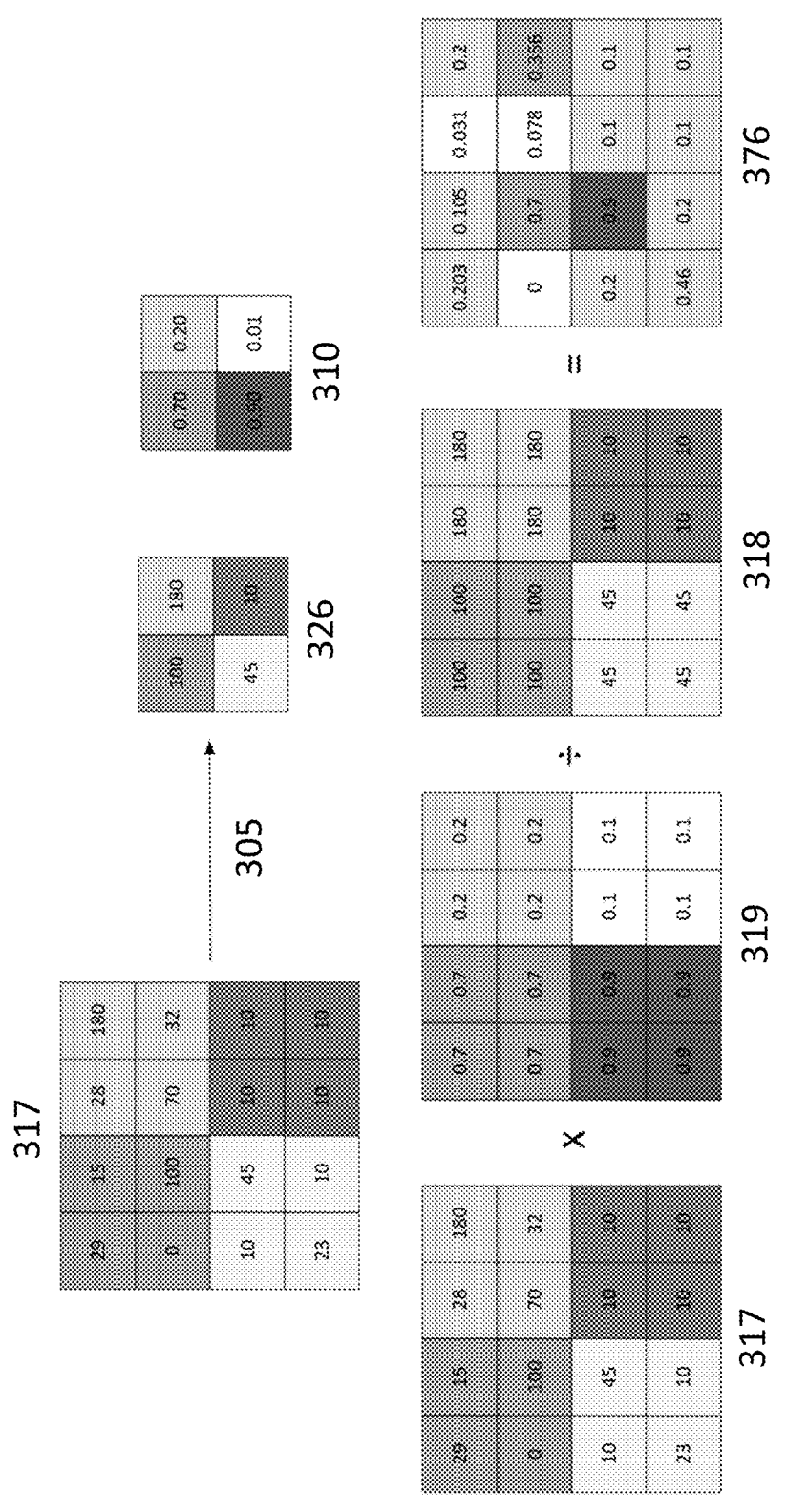
Figure 3C:
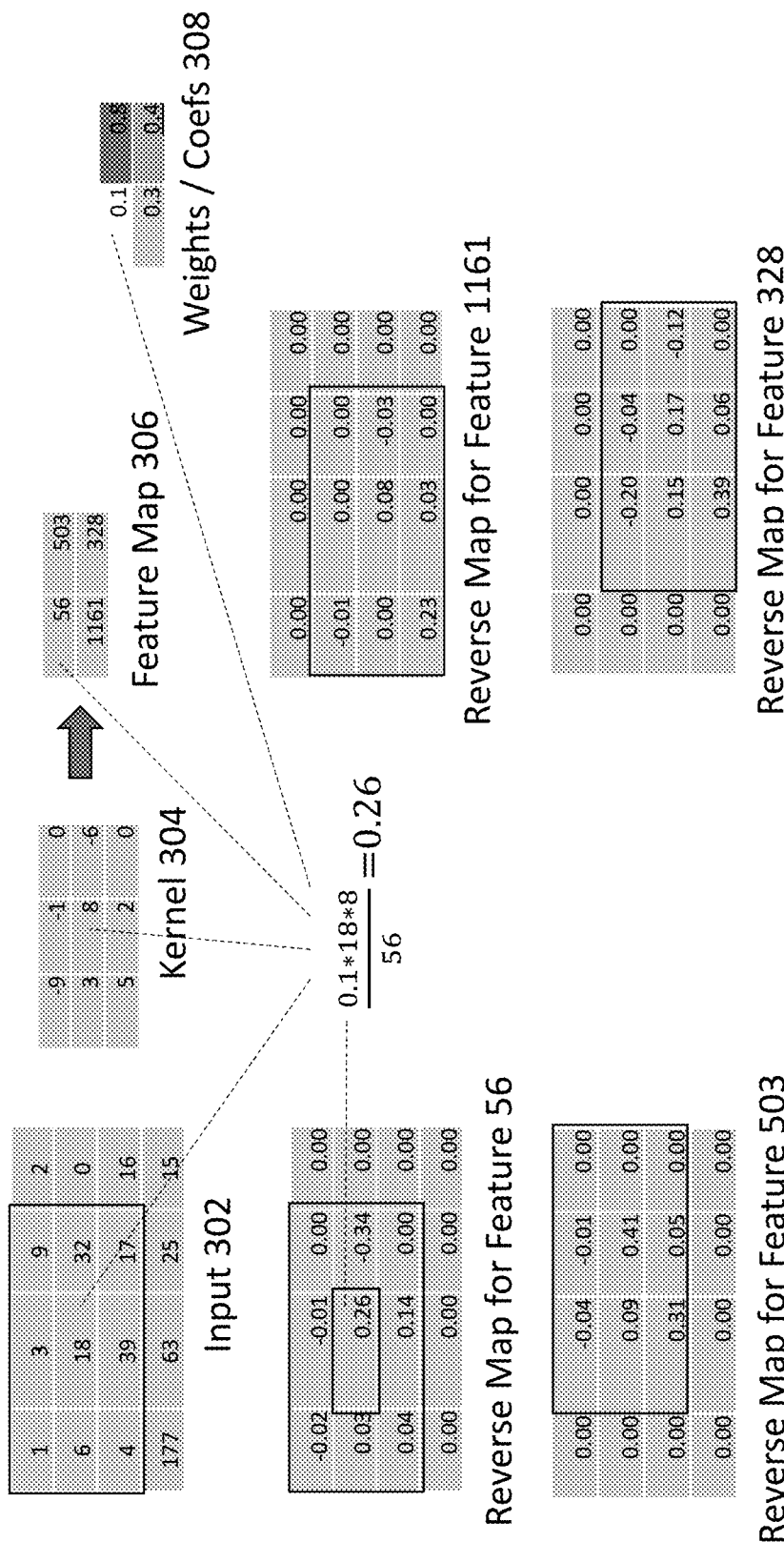
FIG. 3C is an exemplary embodiment of an inverse indexing mechanism (Backmap) for convolution layers with weight distribution.

Referring now to exemplary CNN-XNN embodiment FIG. 3A, FIG. 3A may illustrate an exemplary reverse indexing mechanism 301. An exemplary reverse indexing mechanism may be used to generate explanations in a CNN-XNN. The reverse indexing process illustrated in FIG. 3A may implement steps which are the same as or similar to the steps in the forward pass 207 indexing process illustrated in FIGS. 2A and 2B. However, in such a reverse indexing case, and also in case of layers such as an Upsampling layer, Filter Concatenation layer, Transposed convolution layer or Deconvolution layer, the operation may instead be performed backwards, beginning with the output, and ending with the features of the input. For example, a Transposed convolution layer may be performed backwards using a detransposition operation to pass the explanations to the previous layer. Further, the pooling function, in the Backmap 301, may up-sample the data as opposed to the pooling in the forward pass 207 which down samples the data. Similarly, convolutional layers may be mapped backwards using the reverse indexing mechanism, as illustrated in FIG. 3C.

Multiple layers in a CNN-XNN architecture may be concatenated in a single output format, creating the input for the next layer. In such case, a Branched Backmap may be used to backtrack the explanations from the concatenated layer to the previous layers, using a weighting distribution for each respective previous layer.

In an exemplary embodiment, a CNN-XNN architecture consists of three convolution layers that are concatenated in a single output format for the next convolutional layer. The Branched Backmap backtracks the explanations of the concatenated layer by using an exemplary weighting distribution shown in FIG. 3C, for each respective previous convolution layer.

The output from the prediction network may serve as the basis for generating explanations in a CNN-XNN. The prediction network may weigh the input features by using an equation where each feature is weighed by a coefficient. Each coefficient represents the importance of the final convoluted features. In order to create meaningful explanations, the convoluted features along with their importance may be mapped back to the original input. Since the middle layers of CNN-XNNs are not fully connected dense layers (black-box) but rather sparsely connected (white-box) layers of the XNN, it is possible to apply a reverse indexing mechanism (Backmap) that maps the output of the convoluted features back to the original input. CNN-XNNs are unique in their implementation of a reverse indexing mechanism, which allows fast output of explanations together with fast association of the explanations with the answer and the precise activation path followed by the CNN-XNN during processing.

The creation of the Backmap can generally be implemented as a static process that is executed once when the architecture of the CNN-XNN is determined. If the CNN-XNN architecture itself (i.e., the connections, layers, etc.) is updated, the Backmap may need to be updated once per such architectural update. A possible embodiment may involve the dynamic creation and update of the Backmap if the CNN-XNN architecture is updated dynamically. The once-per-architectural-update nature of the Backmap creation allows for an efficient implementation and room for further optimizations based on the Backmap itself. For example, the Backmap may be used to efficiently identify segments and regions of interest that occur in the input multi-dimensional data, efficiently identify symbols and concepts, and also optimize the process of creating summaries and lower resolution sub-samples of the input multi-dimensional data quickly.

The Backmap may be processed as an external process or as a neural network, or logically equivalent, which performs the inverse function. The neural network may be embedded within the CNN-XNN or kept as a separate network specifically designed for performing the inverse indexing mechanism. The process may start by identifying feature importance, as determined by the coefficients of the XNN network, and moves back, step by step, in reverse. The output weights may be mapped back to the original inputs. The Backmap may use a decoder architecture or logically equivalent techniques for layers in a CNN-XNN architecture where the inverse operation is not achievable. FIG. 3B shows an exemplary embodiment how a Backmap may be applied to pooling layers in order to distribute the weights/coefficients on the neurons of the previous layer. In the case of a pooling layer, the Backmap may multiply the feature attributions 310 319 with the input of the pooling layer 317 and divides the result by the values selected in the pooling layer 326 318 such as Max Pooling 305, to produce the feature attributions to the previous layer 376. Similarly, FIG. 3C shows an exemplary embodiment how Backmap may be applied on convolutional layers. The final output of the convoluted Backmap features is the sum of the Backmap features 56, 503, 1161 and 328. Such steps may be applied sequentially, depending on the type of layer found in the original CNN-XNN network. The mapping may be applied until it reaches the original input, which would enable the conceptual feature importance to be mapped back to the original input.

Still referring to the exemplary embodiment in FIG. 3C, the Backmap may be shown. In FIG. 3C, the input 302 may be convoluted into kernels 304 until it eventually consists of a large feature map 306. The feature map 306 may then be reversed according to each feature. The exemplary Backmap in FIG. 3C illustrates a Backmap for feature 56. First, the input in the top left corner is taken. At the center of the input is input 18. Input 18 is convoluted and analyzed based on the surrounding inputs to form kernels and a feature map. The feature map shows feature 56 along with 3 other features. The weights/coefficients 308 are the weights which are applied to the features in the equation which ultimately gives the answer if activated. The coefficient given to feature 56 is 0.1. The exemplary calculation in FIG. 3C thus involves multiplying the input value (18) by the kernel value (8) and the weight/coefficient value (0.1), and then dividing the result by the value of the feature (56), such that the final result is derived from the relation 0.1*18*8/56. In this exemplary case, the final result is 0.26, which may represent the impact that input feature 56 has on the corresponding output.

The Backmap may apply activation functions, such as ReLU or Sigmoid, to the output of the inverse operation of a Convolution layer, Transpose Convolution layer, Upsampling layer, Filter Concatenation layer or Deconvolution layer, to filter or transform the explanations generated by the CNN-XNN architecture.

The Backmap may be used for monitoring the gradual development of explanations generated during the training phase of a CNN-XNN architecture. In an exemplary embodiment, a CNN-XNN architecture is used to classify x-ray images as illustrated in FIG. 3A. The feature attributions of the input features to the XNN component 222 may be backtracked to the input image for each epoch, during the training phase of a CNN-XNN architecture, in order to monitor the gradual development of the pixel feature importance for each classification label.

The explanations generated by a CNN-XNN architecture may be used to measure the sensitivity and stability of output in a combination of any of a Convolution layer, Transpose Convolution layer, Deconvolution layer, Filter Concatenation layer or Upsampling layer. In an exemplary embodiment, the feature attributions in a particular convolution layer, in a CNN-XNN architecture, as shown in FIG. 3A, may be extracted for a particular classification label, such as pneumonia, to be further analyzed using Nyquist analysis, Bode plots, phase space analysis and other forms of analyzes to analyze the stability and sensitivity of the selected feature maps. The outputs, answers, explanations, and justifications generated by a CNN-XNN architecture may be further transformed and enhanced using appropriate transforms and may include additional information such as confidence intervals, error bar indicators, bias indicators, strength and weakness assessments, risk assessments, cause-and-effect analyses, workflow annotations, decision points, executable actions, and other appropriate information.

The reverse indexing mechanism may be useful for generating explanations either in the form of heatmaps, summary explanations, or in some transformed and/or interpreted form which considers the actual convoluted filters when generating explanations. The convoluted features may be useful for detecting strokes, edges or patterns which may then fuel the explanation generation process which could be visual, textual, audio, etc.

The explanations generated by the CNN-XNN architecture may form a path during the Backmap process. The path may represent the importance of kernel features 402, symbols 404 and concepts 406 for a particular classification label. The generated paths may be clustered in N dimensional space, using unsupervised learning techniques such as K-Means clustering or hierarchical clustering algorithms, to identify groups of paths that lead to a particular classification label. The groups of paths may be represented by the feature attributions of the input image in order to assist the interpreter identify the reason for the clustered paths. The generated clustered paths in N dimensional space may correspond to attractors and allow for integration of phase space analysis techniques together with the determination of stability and chaos within the system being modelled. It is further contemplated that appropriate techniques, such as Nyquist, Bode and Nichols plots and other suitable techniques may be utilized to enhance the resulting quality of the explanation and may also provide suitable starting seed points for: (i.) input data space segmentation and/or (ii.) exemplar-based clustering.

The CNN-XNN architecture may be used in conjunction with appropriate multi-dimensional data reconstruction techniques to reconstruct partially missing multi-dimensional data from the original input data. The CNN-XNN architecture and the Backmap process may be used in conjunction with appropriate multi-dimensional data reconstruction techniques to reconstruct possible multi-dimensional input and/or output data alternatives from a combination of the input, output, explanation, and justification. It may be further contemplated that such reconstruction may be performed with the addition of causal data from one or more causal models. It may be further contemplated that such reconstruction may be performed iteratively during the execution of the CNN-XNN model. It may be further contemplated that a combination of domain knowledge and world knowledge be utilized as part of the reconstruction process. An exemplary embodiment of a CNN-XNN reconstruction application in medical imaging may be used to denoise MRI or PET scans and additionally reconstruct a 3D model from one or more 2D image slices. Continuing with the example, in an iterative version of such application, a 3D model is reconstructed and displayed with increasing level of detail and accuracy as more 2D scanning data is acquired, while the explanations are utilized in guiding the reconstruction and scanning process to focus on areas that need more data and conversely skipping those areas that may be safely skipped without affecting the overall quality of the results, leading to better resource utilization, and in this case, reduced radiation exposure for patients. Continuing with the example, a physics model and a personalized anatomy model may be used to improve the speed and accuracy of the reconstructed 3D image.

In an exemplary embodiment, it may be contemplated that the reverse index mechanism together with the Kernel Labelling method may be efficiently implemented using quantum computing hardware using suitable quantum algorithm implementations, including but not limited to the Hadamard-Fourier transform, Grover's algorithm, Quantum counting, Quantum phase estimation, Quantum element distinctness, Harrow-Hassidim-Lloyd quantum algorithm for linear systems of equations, Quantum approximate optimization algorithm (QAOA), and other suitable quantum algorithms.

In an exemplary embodiment, a CNN-XNN is implemented in combination with a co-incidence imaging and/or correlated-photon imaging sensor system (sometimes referred to as ghost imaging in literature) to enable processing of data combined from multiple sensors, where a sub-set of high resolution sensors directly observe the object and environment being observed by the system and a sub-set of low resolution sensors indirectly observe the object and environment being observed by the system. Continuing with the exemplary embodiment, a combination two implementation choices are contemplated: (i.) a classical method using correlated coherent electromagnetic beams, and/or (ii.) a quantum method using entangled photons shared between a combination of high- and low-resolution sensors. In an exemplary embodiment, in a medical imaging application, a correlated photon imaging system with a miniaturized low-resolution sensor that is inserted in vivo in a living organism is used to obtain images using an externally placed high-resolution sensor in a non-invasive manner, which are then subsequently processed with the rest of the CNN-XNN system. In a further exemplary embodiment, a correlated photon system is used for engineering part inspection, for example, for inspection of relatively inaccessible parts of aviation engines, in a non-invasive manner that reduces the amount of maintenance time required to take apart complex engineering components. In such an example, detected defects and/or stress patterns are analysed by a CNN-XNN system to spot possible areas of failure, fatigue stresses and other wear and tear and provide potential action options and the explanation and rationale underlying the options offered. It is further contemplated that Compressed sensing techniques may be utilized to reduce the number of measurements required for image reconstruction and/or explanation generation within the CNN-XNN system. Compressed sensing utilizes an optimized recovery of the under-sampled data, when the number of samples is fewer than those predicted to be needed by the Nyquist-Shannon sampling theorem. Such compressed sending techniques are useful when the CNN-XNN system needs to recover under-sampled data from a combination of (i.) sparse data in the relevant input space; (ii.) incoherence of the input data. A suitable signal processing technique may be utilized to reconstruct and acquire the minimum sufficient amount of data required for signal reconstruction. CNN-XNN systems may offer a practical implementation advantage of compressed sensing techniques by being both white-box models and by utilizing the linear and/or non-linear systems of explanation coefficients inherent in the XNN as part of the reconstruction method. In an exemplary embodiment, for medical applications, compressed sensing may be used with an MRI system that implements a CNN-XNN to acquire enough data to construct the volumetric image produced by the MRI faster and more efficiently by taking fewer scans to find the necessary Fourier coefficients for image reconstruction, resulting in a high quality MRI scan with faster scanning times. In a further exemplary embodiment, the compressed sensing technique may be used with a CT scanner to enable a high-quality CT scan to be obtained with far fewer X-ray projections, resulting in less radiation dosage for patients being scanned.

In a further exemplary embodiment, an optical processor or photonic processor may be utilized in the implementation of part or all of the CNN layer of a CNN-XNN, using for example, optical frequency combs or appropriate hardware implementations. It is further contemplated that a hybrid optical-electronic implementation that incorporates part or all of the CNN and the XNN parts using a combination of the optical and electronic parts of the hybrid implementation may be used to improve the performance of the resulting implemented opto-electronic CNN-XNN system. It may be further contemplated that an exemplary embodiment may also employ specially manufactured optical elements that have etched or otherwise manufactured patterns that perform a combination of interference, convolutional and/or transformation operations optically. Such optical elements may be used to improve the performance of a CNN-XNN based system and provide a practical solution for a digital-analogue hybrid implementation. It may be further contemplated that optical interferometry using suitable implementations such as a combination of Mach-Zehnder, Fizeau, Fabry-Pérot, Jamin, Ramsey-Bordé and/or other suitable implementation may be incorporated as part of the CNN-XNN system as a practical solution for a digital-analogue hybrid implementation.

Figure 4:
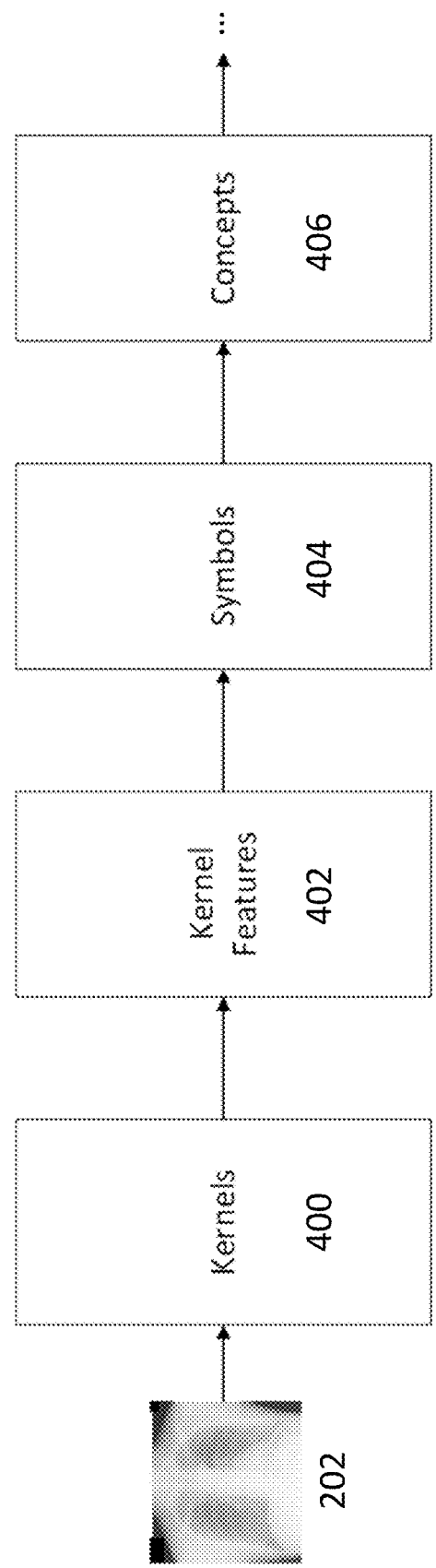
FIG. 4 is an exemplary embodiment of various layers of interpretability.

Referring now to the exemplary embodiment in FIG. 4, FIG. 4 may illustrate different levels of possible explanations. When applying the reverse indexing mechanism, explanations may be generated at different level of abstractions, beyond heatmaps, summaries, attribution diagram, causal diagrams, relational graph, and transformed versions of the input, output and/or the explanations. It is further contemplated that a filtered and/or interpreted version of the input, output and/or the explanations may be used to generate further explanations in conjunction with the reverse indexing mechanism. It is further contemplated that such explanations may be generated in a hierarchical manner and at different level of detail and in accordance with personalized user preferences, goals and/or plans. In the example illustrated in FIG. 4, the different levels may include kernels 400 and kernel features 402 (which may be, for example, small, filtered elements of an image such as a line or boundary), symbols 404 (which may, for example, correspond to a feature such as an eye or nose shown in the exemplary drawing), and concepts 406 (which may include, for example, entire faces with which the input 202 data may be associated). An exemplary embodiment may contain more or less layers, but for ease of explanation this exemplary embodiment includes just these three. Each layer may contain its own set of partitions, or rules. Each partition may include coefficients which may indicate the importance of various features applicable to the partition. Continuing with reference to FIG. 4, in an exemplary application, the concepts 406 may be passed on to a combination of a machine learning system pipeline, a neurosymbolic system, a workflow system, a dedicated hardware system, a distributed system or an appropriate system for further processing and consumption.

To provide a more detailed explanation of each of the contemplated layers, the kernel feature layer 402 may be the lowest level. The kernel feature layer 402 may identify features such as diagonals, edges, and the like, depending on the kernel structure itself. A set of partitions may be applied to the kernel feature layer 402 and may be used to determine which kernels 400 are most important. Next, a symbol layer 404 may be one level higher than the kernel feature layer 402. The symbols may include the identification of more complex concepts, such as eyes, ears, a nose, and the like. A symbol may be a combination of multiple kernel features 402. A symbol may also be formed as a reference to other related symbols, for example, to group related symbols together in one reference, such as an eye, ear, nose, and the like. The partitions in the kernel feature layer 402 may indicate which kernels 400 and kernel features 402 were important to identifying each specific symbol. Finally, the concept layer 406 may be the highest layer. Each concept may be a combination of one or more symbols. An exemplary concept may be a pair of eyes, a face, a facial expression, and the like. The partitions in the symbol layer 404 may indicate why a concept was identified. For example, a face may be identified in the concept layer 406 because the symbol layer 404 identified two eyes, one nose, and one mouth. The explanation may then also extract information from the kernel feature layer 402 which indicated why each eye, nose, and mouth were identified. As a result, an explanation may be provided which provides insight as to why each step of the process was taken.

Exemplary transformations may involve transformation of the prediction output using some form of structure such as (i) hierarchical tree or network, (ii) causal diagrams, (iii) directed and undirected graphs, (iv) multimedia structures, (v) sets of hyperlinked graphs, or suitable structures.

The features may be combined with taxonomy and a causal model. The features which could be hierarchal should be reflected either by the partitioning and/or via the combination of taxonomy and/or causal logic. The convolutional kernels themselves may be domain independent and generic, and the resulting kernel features may also be rather domain independent as well. As the CNN-XNN goes towards symbols and concepts, the resulting hierarchy becomes more domain dependent and more specific. This particular property of CNN-XNN hierarchies can be exploited effectively when generating explanations, as more domain knowledge can be incorporated into explanations at a symbol and concept level, while more general knowledge, like geometric shape knowledge, and so on, can be used to describe the kernels and related kernel features. This property also enables this invention to be subsequently embedded within larger explanation systems, more complex XNN combinations and also incorporate third party and expert knowledge effectively in an extensible manner. Additionally, it may be contemplated that a universal set of priors or shape primitives at the kernel feature level may be supplied as part of the CNN-XNN architecture to enable an efficient method of creating a domain independent taxonomical analysis of the resulting higher-level hierarchy of symbols and concepts. The universal set of priors, corresponding to potential shapes such as diagonals, polka dots, vertical and horizontal bars, and so on for images, and other appropriate data for non-image type of multi-dimensional data, can utilize the kernel activation information provided by the CNN-XNN and its Backmap to precisely decompose any result into a combination or transformation (using an appropriate function or set of functions) of universal priors. Each such combination may be assigned a label or a tag in the hierarchical (or even dimensionally reduced and/or transformed) taxonomy which may be used to generate better quality explanations and may aid in improved interpretability of the results.

It may be further contemplated that a predictive CNN-XNN may be utilized in conjunction with taxonomical and ontological knowledge and/or domain knowledge to identify and extract causal models and causal relationships between a combination of: (i.) one or more multi-dimensional input features, (ii.) one or more endogenous and/or exogenous causal variables, and (iii.) a combination of one or more taxonomical and/or domain knowledge features.

In an exemplary application, a predictive PR-CNN-XNN is used to process video footage coming from an automated manufacturing process involving fragile objects, such as ceramic containers. A physics model together with material science data about the ceramic containers themselves is incorporated with the PR-CNN-XNN. As more examples of ceramic containers falling onto various factory surfaces, like conveyor belts, kiln surfaces, the manufacturing floor, and so on, are processed by the system, certain causal relationships can be automatically inferred. For example, the PR-CNN-XNN based system may infer that if the angular speed of the robot arm dropping the ceramic container onto a kiln tray makes the container fall at too high an angle and with too much speed, damage may occur to such ceramic container. An appropriate DAG or SCM may then be built to accurately estimate the allowed range of angular speeds of the robot arm that may prevent damage to occur to the ceramic container, enabling the system to work as fast as possible while at the same time preventing damage from occurring above a certain acceptable threshold.

A hierarchy of features, symbols, and concepts may store knowledge and explanations in a manner that reflects the way that humans reason, thus providing quality explanations. The inherent hierarchical structures in an XNN enable this hierarchical processing to be implemented in a practical manner in various embodiments including but not limited to general processing hardware, specialized hardware and ASIC circuits, FPGAs, Internet of Things (IoT) devices, and edge devices. It may be contemplated that CNN-XNNs may be tightly coupled with sensor systems using analogue and/or digital electronics, enabling, for example, a low-cost camera system to be implemented as an ASIC or CMOS chip, which may then be capable of outputting features, symbols, and concepts together with an explanation for further processing downstream along with the raw sensor data. This can significantly reduce the amount of processing needed downstream, enabling new future applications that are currently impossible to implement. It may be further contemplated that CNN-XNNs may be implemented directly as a hardware circuit either using (i.) flexible architectures like FPGAs, or (ii.) more static architectures like ASICs or, or (iii.) neuromorphic architectures that are suited for the hardware implementation of connectionist models such as CNN-XNNs, or (iv.) quantum computing hardware.

In an exemplary embodiment, CNN-XNNs may enable advanced camera systems with advanced inbuilt image analytics to be deployed in low connectivity and low power environments, such as roadside traffic analysis or video security applications. CNN-XNNs may also make more practical applications of autonomous vehicles, especially where power and bandwidth are limited—for example, in underwater navigation, driverless cars, or UAVs, where connectivity may be an issue and onboard power management places strict limitations on the amount and type of processing that can be applied. It may be further contemplated, with reference to this exemplary embodiment, that advanced camera systems implementations of an event-driven hardware type, and/or those that support some form of convolutional operation at a hardware sensor level, may take advantage of the white-box nature of CNN-XNNs to improve the quality and performance of the implemented system. For example, a CNN-XNN may be used to process event-driven multi-dimensional data streams, that may be segmented by time and/or events in such implementations, in an incremental fashion, supporting both feed forward processing and simultaneous updates of the reverse indexing mechanism (Backmap) without having to process an entire input data frame. In a further example, a CNN-XNN may be used to directly utilize pre-processed or partially processed input data and correctly perform a combination of fusion, routing, transformation, dimensionality reduction and/or flatten operations, taking advantage of the white-box nature of CNN-XNNs to do so correctly and efficiently.

In an exemplary embodiment, a CNN-XNN may also be combined with additional pre-processing steps. In another embodiment, the neural network may have an additional network for segmenting an image into objects. The objects may then be modelled using a combination of object attributes, relationships between objects, combined with taxonomy, causal data, user, and world models. Image data may be segmented into objects similar to the way the human brain identifies multiple objects in view. Such data then serves as an input to the general XNN architecture, which would be able to output predictions and explanations simultaneously.

Figure 8:
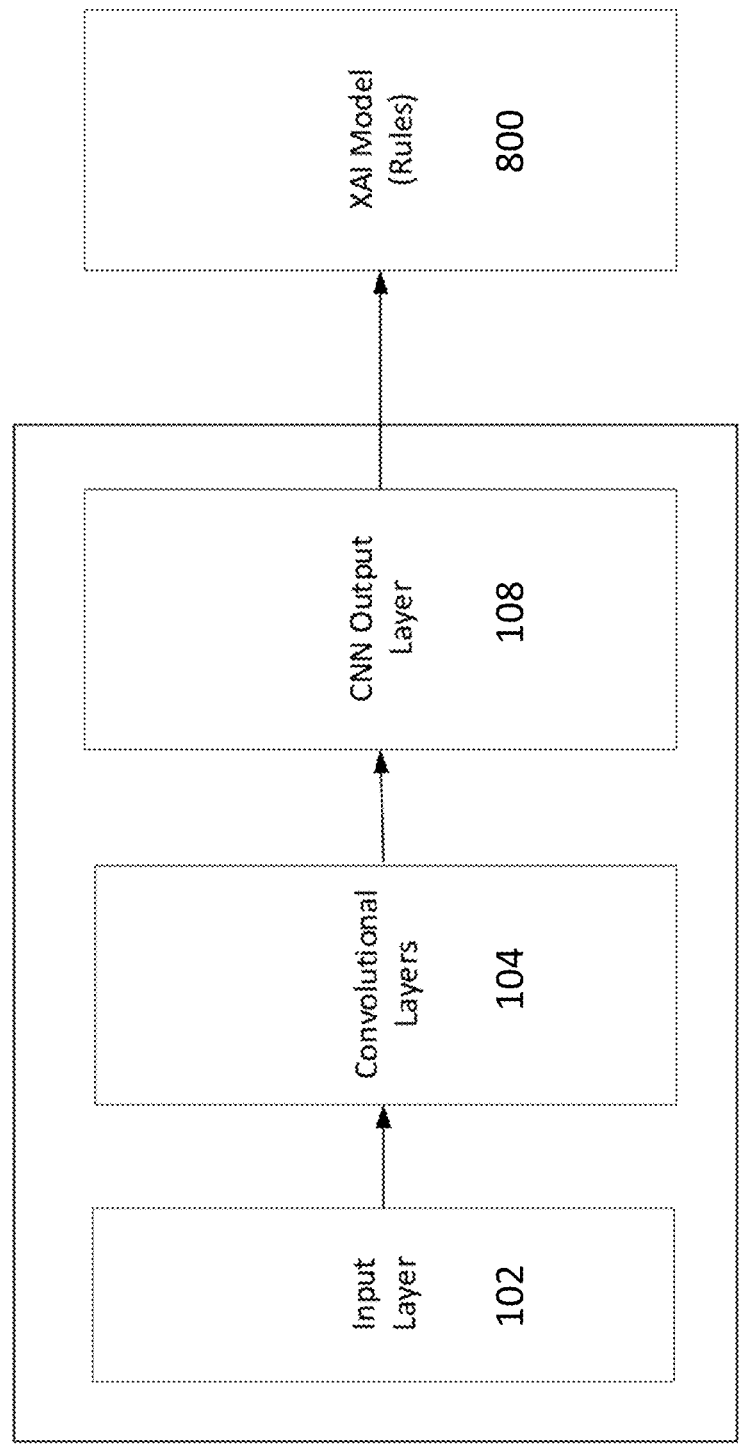
FIG. 8 is an illustration of an exemplary embodiment of a CNN-XAI architecture.

In an alternative exemplary embodiment, CNN-XNN may also be logically equivalent to a CNN-XAI model as shown in FIG. 8. Similar to the CNN-XNN architecture, the system starts with an input layer 102, which may provide for various input data to be received by the system, such as an input image or video, historical records, and the like. Next, a convolutional network 104 may be implemented which outputs a vector of convoluted features in an output layer 108.

The convoluted features may then be induced via an external system in order to create an XAI Model 800 in the form of rules, whereby a rule includes partitions with linear or non-linear equations. The combination may include a CNN which serves as a preprocessing network to the XAI Model. Such an embodiment may also be converted to a CNN-XNN (and vice-versa) through the necessary conversions. The main difference when applying the conversion process is to separate the pre-processing functions (in this case, the CNN) from the general architecture (XNN) or general model (XAI Model).

Figure 5:
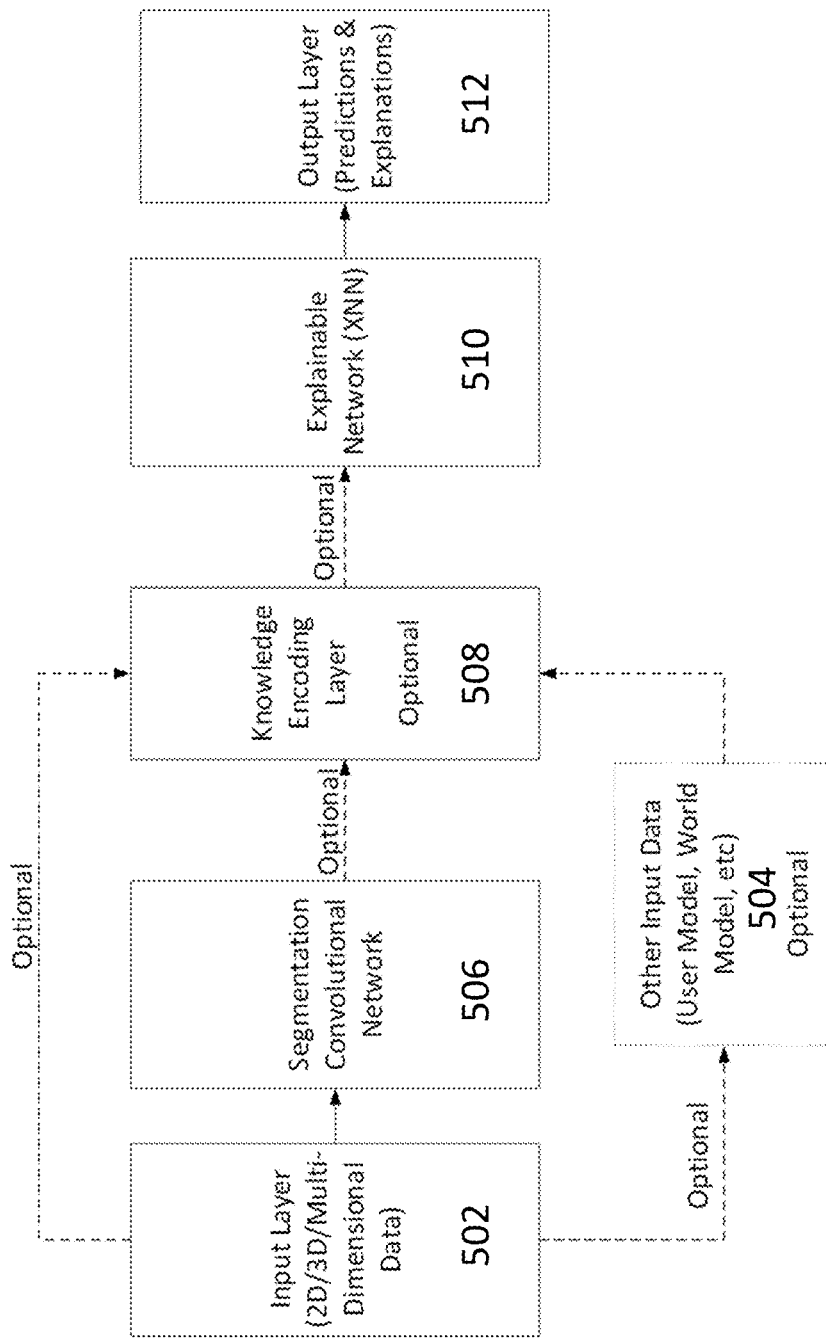
FIG. 5 is an exemplary embodiment of a CNN-XNN with image segmentation.

FIG. 5 illustrates the architecture of an exemplary CNN-XNN which includes image segmentation for extracting the features from image-based data. In an exemplary embodiment, a CNN-XNN can provide a diagnosis using, for example, X-ray images or MRI scans. The CNN-XNN may determine if a specific X-ray is normal or if it has a defect, such as pneumonia, along with an explanation why such a result has been provided. In a black-box setup, a classifier would simply output the class label, possibly with a probability for each label. The different components in the architecture are explained below.

The input layer 502 may include raw 2D or 3D data, which may, such as in the previous example regarding X-ray diagnosis, be formed from or include a number of X-ray images. Like traditional deep neural networks, data may be split into training, validation, and testing data.

Figure 6:
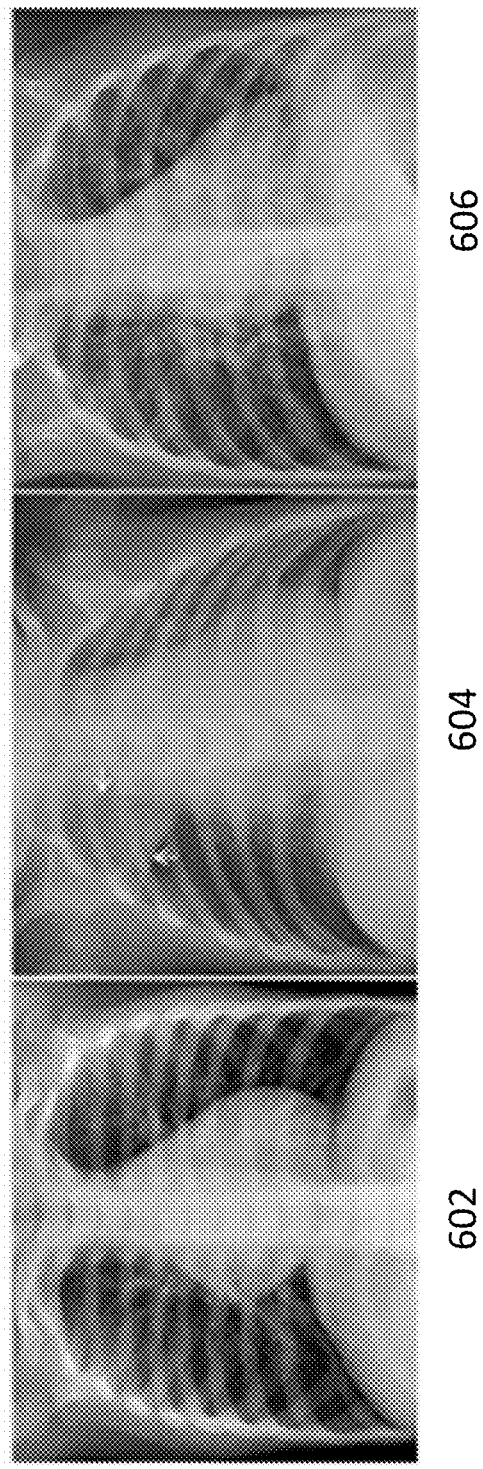
FIG. 6 is an exemplary embodiment of CNN input data with the respective output labels.

Referring now to the exemplary embodiment in FIG. 6, FIG. 6 may illustrate exemplary input data using X-ray data. In the provided exemplary images, the normal chest X-ray 602 may depict clear lungs without any areas of abnormal opacification in the image. The second input X-ray 604 may depict bacterial pneumonia, which typically exhibits a focal lobar consolidation, in this case in the right upper lobe (white arrows), whereas viral pneumonia, as shown in the third input image 606, manifests with a more diffuse "interstitial" pattern in both lungs.

Referring back to the exemplary embodiment in FIG. 5, in addition to the X-ray data, other healthcare records about the patient may also be optionally incorporated to the neural network 504. For example, in one particular exemplary embodiment, a world model incorporating the current healthcare trends and disease may be added in order to create a better holistic view.

Figure 7:
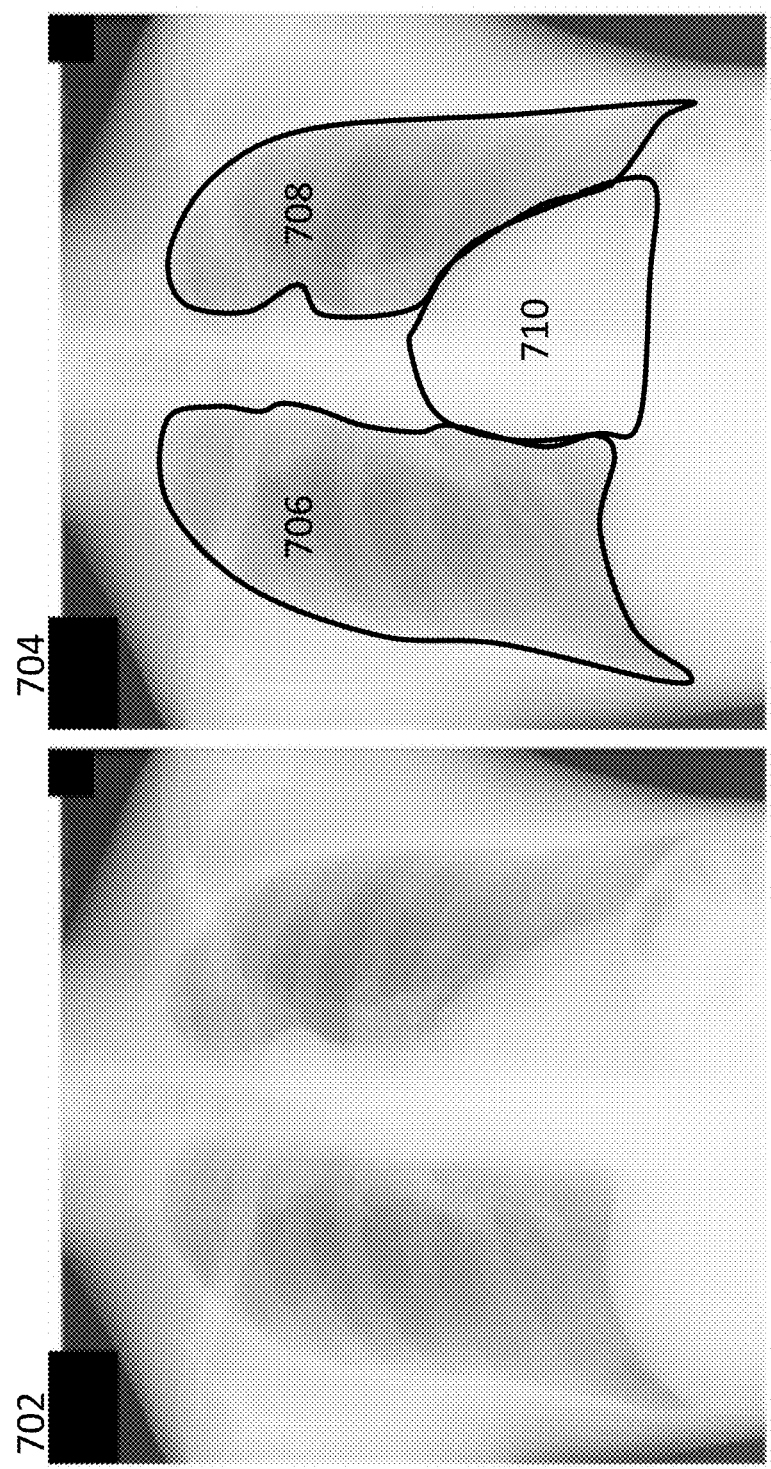
FIG. 7 is an illustration of data used as input for a CNN architecture with the output segmented images.

Next, the segmentation convolutional network may segment the raw input image into segmented objects 506. Several methods may exist for segmenting the image into individual objects; for example, such segmentation may be performed by a supervised, unsupervised, or pre-trained network. For example, FIG. 7 may illustrate an input image 702 followed by a segmented input image 704. In the embodiment of FIG. 7, the segmented input image 704 has been split up into segmented objects. The detected objects in this exemplary case are the left lung 706, right lung 708, and the heart 710. CNN-XNNs may implement a trainable or non-trainable version of such network or model, which may then be combined with the rest of the system.

In a next step, a knowledge encoding layer may extract several attributes from the identified objects 508. For example, the size of each organ, the distance from the left to the right lungs, costophrenic angles, cardio diaphragmatic angles, rib cage contour, and the like may be extracted. This information may also be optionally blended with external data provided via the optional input layer 504. Rotational invariance and scale invariance mitigation methods may also be incorporated as a step to improve the quality of the feature engineering process.

Additionally, causal models may also enrich the quality of the process by adding a cause-and-effect element to the features. For example, it may be known through a causal model that asthma is linked to a higher risk of pneumonia, and such a link may be modelled and linked with all known data points which have been inputted to the system. In an exemplary embodiment, a causal directed acyclic graph (DAG) model may be connected to a CNN-XNN system to provide an enhanced explanation that takes into consideration the cause-and-effect knowledge introduced via the causal model. As a further example, explanatory output may be linked back to processed versions of the input data, to illustrate the cause-and-effect processes and results in a more understandable manner. Continuing with the example, in a medical application that analyses Positron Emission Tomography (PET) scan data and a causal model incorporated within a CNN-XNN may output an annotated PET scan image highlighting the effect of a particular hotspot identified in the PET scan, for example, in the lungs, on other parts of the body, suitably overlaid on an anatomical image representing the patient, to more accurately explain the ongoing metabolic processes and other physiological activities in the patient being scanned.

Finally, it may also be useful to incorporate taxonomy data as part of this knowledge encoding process. For example, certain medical records may include information about specific medicine and treatment which has been given to a specific patient. Such taxonomy links may discover new important links which can then be incorporated into a determination of the correct prediction or classification along with a meaningful explanation.

Taxonomy may be able to add additional features which are not available through the original dataset. Taxonomy data may be added in the knowledge encoding layer. Taxonomy data consists of global knowledge which may be relevant by adding inferences which are known to the model. For example, the taxonomy data of a specific medicine code or name may provide data indicating possible conditions a particular patient may have. The taxonomy data may be retrieved from a database, such as an online database, or could be specifically tailored to a particular implementation. For example, taxonomy data for a system which receives the names of medicines as input may include the side effects of various medicines, as well as the ailments that they may be used to treat, among other information. Taxonomy may be seen as an extension to the external data, such as world or user model. Taxonomy data can also add a level of understanding of the dimensions, metrics, and units of each feature, giving rise to better explanations. The addition of external meta-data about each feature can be combined with the XNN explanation coefficient outputs to create the long sought-after link between the connectionist architecture of an XNN (and ANNs in general) with symbolic logic processing. In an exemplary embodiment, a CNN-XNN may be link its symbolic output with an appropriate taxonomy such as YAGO-SUMO together with an appropriate logical inference system to perform tasks that seamlessly incorporate, and blend machine learnt knowledge with human knowledge and that may solve zero-shot inference and zero-shot learning problems. In a further exemplary embodiment, a CNN-XNN system may be incorporated as an explainable model within a more generic Explanation and Interpretation Generation System (EIGS) that utilizes the neurosymbolic output of a CNN-XNN in the creation of answers, explanations, justifications, and interpretations within a personalized goal-plan-action architecture.

XNNs and CNN-XNNs offer a clear path to integrating neural networks with symbolic logic processing by utilizing the explainable outputs, optionally enriching them with meta-data, and possibly causal models, and constructing the necessary input for symbolic logic processing. The CNN-XNN hierarchy of kernel features, symbols and concepts can be enhanced significantly with the addition of taxonomical data, allowing it to be directly plugged into symbolic logic processing systems, or automated knowledge discovery systems like curiosity driven adversarial neural networks, or expert systems, or some future composition of Deep Learning systems that uses these neuro-symbolic representations to achieve further processing, or some other future AI system that understands and differentiates between symbols and concepts.

An exemplary embodiment may implement a unique Kernel Labelling method that allows the labelling of the progressive refinement of patterns, symbols and concepts from any data format that allows a pattern recognition kernel to be defined, together with a suitable key point description function and an activation maximization function.

An exemplary Kernel Labeler may be illustrated via an exemplary medical application embodiment utilizing a CNN that is fully interchangeable with its explainable counterpart, a CNN-XNN.

Figure 9:
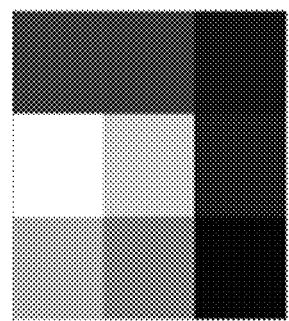
FIG. 9 is an illustration of an exemplary embodiment of human defined kernel primitives.
Figure 9:
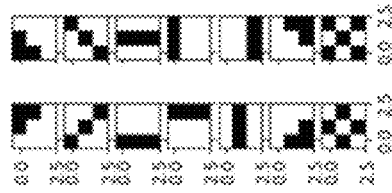

A kernel primitive p 900 may be defined as a matrix of a certain shape being searched for in the respective filter being analyzed. FIG. 9 illustrates an exemplary human defined kernel primitives 900. The Kernel Labeler may initially analyze the first convolutional layer using human defined kernel primitives and may proceed to slide through the convolutional and pooling layers in the CNN architecture. A kernel primitive p may be defined as the same matrix size as the kernel size of the first convolutional layer. In an exemplary embodiment, the operation of a kernel is element wise multiplication, and the visual shapes of kernel primitives 900 may be based on human-defined knowledge, including shapes such as corners, diagonal lines and vertical lines found in a typical image.

A set of human-defined kernel primitives $S_p$, where $S_p = [p_1, p_2, \ldots, p_p]$, may be defined for a particular CNN architecture. The set of human-defined kernel primitives $S_p$ may represent the vocabulary to be used for the analysis of the first convolutional layer in a CNN architecture. A descriptor d may be constructed for each kernel k in the first convolutional layer, having a length of the size of $S_p$. The descriptor d may contain a value for each human-defined kernel primitive 900 in the defined vocabulary, that is $S_p$, and this value may represent the presence of the respective kernel primitive in the kernel k.

The presence of a kernel primitive p in a kernel k may be measured by analyzing the weights of k 910, in the first convolutional layer, to locate the shape of p within kernel k. The shape may be detected if the value difference of each combination of weights of the shape in kernel k would not exceed a threshold $\sigma$ and if the threshold $\sigma$ of the kernel primitive is not exceeded for $N \in R$ occurrences. In an exemplary embodiment, a descriptor d generated for kernel k 910 consists of three human defined primitives: Right bottom corner with a weight value of 0.81, Bottom Horizontal line with a weight value of 0.72 and Right Vertical Line with a weight value of 0.68. The detection of primitives may be scale, rotation, and spatially invariant. This enables the detection of shapes that are on different scales, at different rotations and at different positions.

Figure 10A:
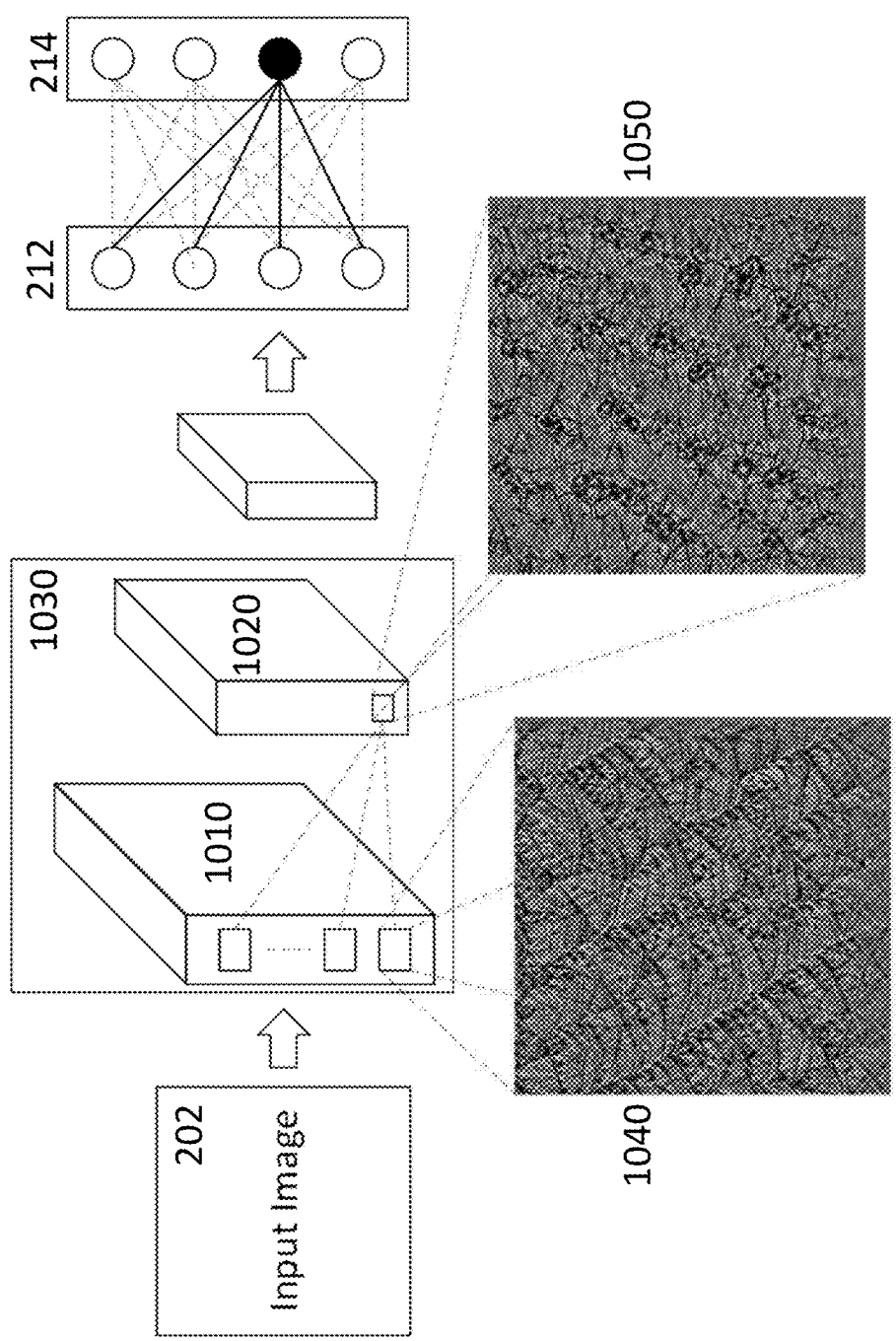
FIG. 10A is an illustration of an exemplary embodiment implementing sliding window primitives in a black-box CNN architecture.
Figure 10B:
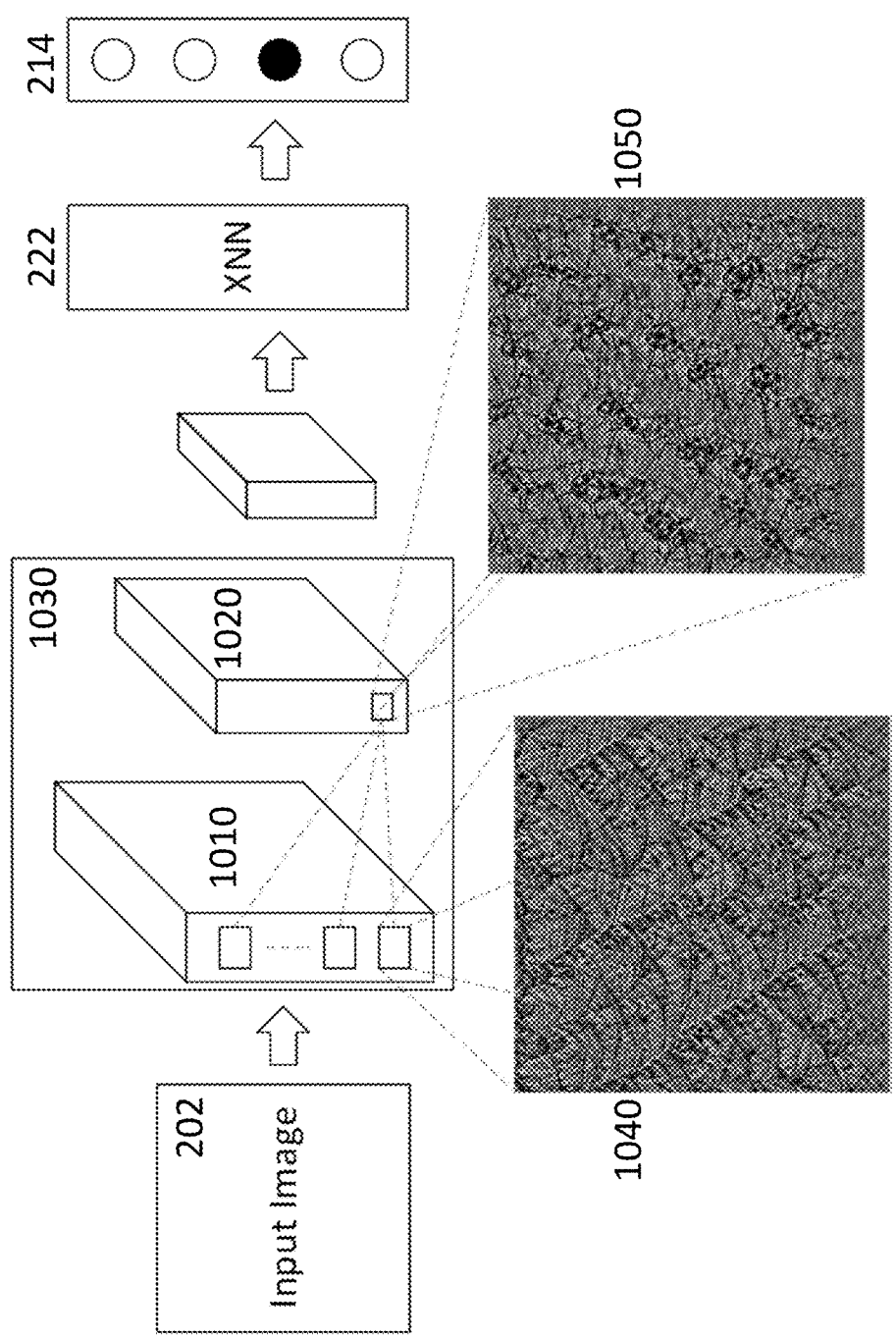
FIG. 10B is an illustration of an exemplary embodiment implementing sliding window primitives in a CNN-XNN architecture.

The descriptive analysis of the first convolutional layer may be the initial step of the Kernel Labeler. FIG. 10A illustrates the analysis of the remaining layers, using the sliding window primitives method, of a black-box CNN architecture. FIG. 10B illustrates the analysis of the remaining layers, using the sliding window primitives method, of a CNN-XNN architecture using a sliding window approach.

The initial layers in an exemplary machine learning model may be constructed of filters which look for basic patterns such as horizontal and vertical lines. However, deeper layers may include filters that look for complex patterns as primitives and the previously discussed algorithm to detect the presence of primitives may not yield the optimal results, necessitating the need to utilize a suitable component integration technique, such as activation maximization (AM) or multifaceted feature visualization (MFV), to project patterns onto the input space.

The component integration technique may generate a synthetic image for each filter in the layer. The component integrated filters 1040, 1050 of the primitive layer 1010 and the current layer 1020 may be analyzed using key point description techniques that aim to extract distinctive invariant features 1100 from images, in this example. The Kernel Labeler may implement key point descriptors using a combination of the SIFT, SURF, GLOH or any other contemplated method.

Figure 11:
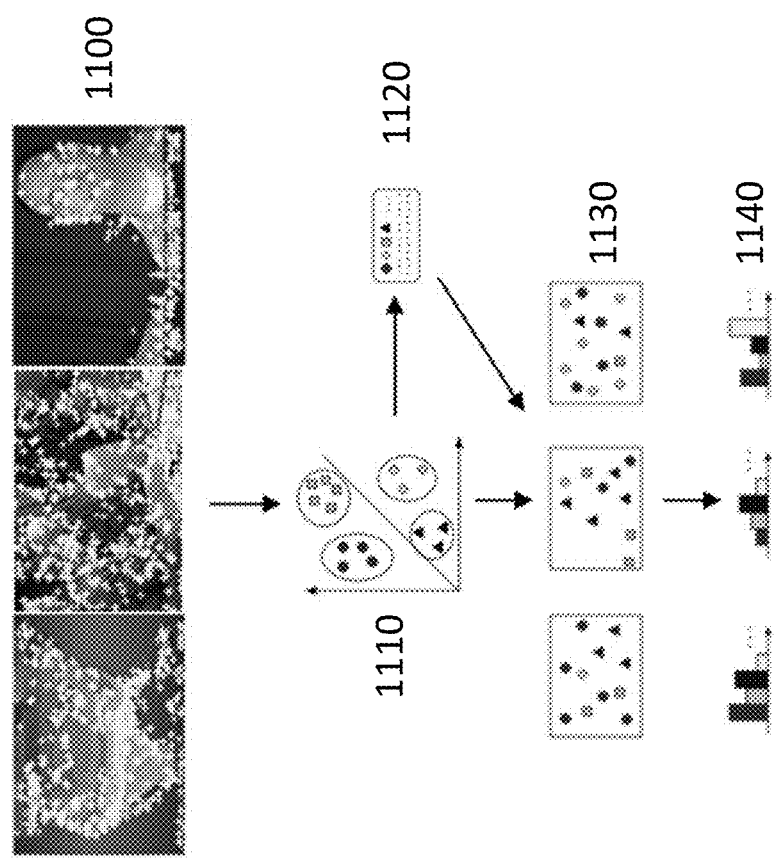
FIG. 11 is an illustration of the Bag of Visual Words concept (Yang et al, 2007) (Prior Art).

The next step performed by the Kernel Labeler may cluster similar features to create a vocabulary of distinctive features. Distinctive features and their respective kernels may be represented using a variety of methods including, but not limited to, histograms, eigenvectors, multi-dimensional descriptors, spatial bag of word models, scale invariant models, rotation invariant models, convolutional patterns, cross-correlation patterns, auto-correlation patterns, Hugh transforms, Radon transforms, Fourier transforms, integer/real/complex/quaternion/octonion transforms, Walsh functions, state-space transforms, phase-space transforms, Haar and non-Haar wavelets, generalized L2 functions, fractal-based transforms, Hadamard transforms, categorical descriptors, multi-dimensional Bezier curves, subsets of an explainable neural network, and suitable alternative representations. As illustrated in FIG. 11, the bag of visual words (BoVW) technique may be used to create a codebook 1120 of features, such that similar distinctive features are grouped together 1120. BoVW may be used to cluster the N-dimensional features 1110 using a suitable clustering algorithm such as K-Means, obtaining a set of centroids 1120, where each centroid represents a group of similar features. Key points detected in synthetic images of the primitives and the layer filters being analyzed may be associated with the nearest centroid 1130 by the clustering algorithm. A descriptor 1140 may be constructed, for each primitive and filter, representing the frequency count of each centroid. Similarity metrics, such as cosine similarity, may be used by the Kernel Labeler to identify the progression of features from basic shapes to complex patterns in a CNN architecture or other similar progressively structured machine learning architecture. Translational invariance and translation equivariance methods may also be used by the Kernel Labeler to ensure that translation variances from basic shapes to more complex patterns are handled correctly. The use of the novel Kernel Labeler mechanism enables explainable machine learning models to achieve and practically implement neurosymbolic processing, allowing connectionist models such as CNN-XNNs to be seamlessly linked into larger AI and ML systems that involve logic and symbolic processes and vice-versa.

The Kernel Labeler component integration method implementation performance may be improved with the addition of regularization techniques, such as Jitter (Reed et al., 1992), total variation (TV) (Mahendran et al., 2016) and center-biased (Nguyen et al., 2016) techniques to generate results that are more interpretable to human users.

The Kernel Labeler can be used on any data format that allows for a pattern recognition kernel, key point description function, and component integration function to be defined on that data format. For example, the Kernel Labeler can be used on 3D scans using 3D primitives, 3D key point description function and a 3D Activation Maximization function. In another example, the Kernel Labeler can be used on speech data using a phoneme-based audio primitive, spectrogram based key point description function working in Fourier transformed space, and an activation maximization function based on audio data. The Kernel Labelling embodiment can thus be extended to video, sound, speech, text, 3D scans, tabular data, and haptic data.

An exemplary Kernel Labelling embodiment may be combined with the CNN-XNN Backmap to project the output classification results back to the input space. For the medical application example, the image pixels that are deemed to be the most important for the classification output can then be highlighted appropriately by the Kernel Labeler, as illustrated in FIG. 3A. The Backmap integration would enable the Kernel Labeler to project relevant elements of the output explanation and/or interpretation back to the input space, making it easier for system users to understand and comprehend the resulting explanation and/or interpretation.

An exemplary Kernel Labelling embodiment may also utilize a variety of Natural Language Processing techniques to assign human readable labels to kernels, symbols, and concepts. For example, in FIG. 9, the second kernel of the second column of 900 may be labelled as "left to right rising diagonal" or "bottom left to top right diagonal". Similarly, the symbol 910 may be labelled as "bottom right corner" or "bottom right edge".

In an exemplary medical application, a chest X-Ray input image 202 is analyzed for possible pneumonia. The exemplary medical application may require the output to be derived using an interpretation template method such as the Kernel Labeler method. The Kernel Labeler may analyze the progression of patterns using the sliding window Kernel Labelling technique 1030, as shown in FIG. 10, for the respective classification label from a set that is specified in a taxonomy. The Kernel Labeler may visualize and analyze the feature maps produced by the convolutional layers and calculate the component integration value for the respective filter. The component integration may then be aggregated to determine the activation of a specific filter or set of filters for the input image 202, and thus associate the correct label for the detected pattern, symbol, or concept within the input image 202.

In an exemplary embodiment, different types of explanations and meta-explanations may be clustered into concepts and concept hierarchies. Human knowledge injection may be implemented. Further, an exemplary embodiment may provide a novel domain-specific optimization method for explainable machine learning systems that improves the quality of explanations and interpretations in a semi-supervised or unsupervised manner. Another exemplary embodiment may provide a novel data format agnostic Kernel Labelling method that may associate human readable labels with data formats such as images or 3D scans that are not textual in nature.

The references to kernel features, symbols and concepts may be made purely for convenience, as these may also be defined as a symbol of a lower or higher level in a symbolic hierarchy, with kernel features being the symbols at the lower bottom level of the hierarchy and concepts being the symbols at a higher top level of the hierarchy. The CNN-XNN symbolic hierarchy can be thus cover explanation hierarchies for all variants of XNNs, as long as they support symbols for at least one level of detail. The addition of symbolic hierarchies to connectionist models such as neural networks is a novel aspect that is only possible due to the white-box nature of XNNs. The symbolic hierarchy also applies to XAI Models including but not limited to those created using our induction method and also to logical equivalents such as eXplainable Transducers and Transformers (XTTs).

Neurosymbolic processing systems, such as the ones that may be built using CNN-XNNs and its symbolic hierarchy, may provide a more efficient and practical solution for the integration of knowledge and reasoning in a wide variety of applications, including image and video understanding, scene recognition and understanding, and a seamless integration of causal models and real-life knowledge, such as physics models and/or common-sense knowledge bases such as ConceptNet, WordNet, YAGO, YAGO-SUMO and Cyc.

In an exemplary embodiment, the neurosymbolic output from a CNN-XNN may be integrated with a combination of practical symbolic systems including but not limited to first order logic reasoning systems, second order logic reasoning systems, Type 1 and Type 2 Fuzzy Logic systems, Markov Logic Networks (MLN), Bayesian Networks, Logic Tensor Networks (LTN), Qualitative Spatial Reasoning (QSR) logics, Region Connection Calculus (RCC), Description Logics (DL), Fuzzy Description Logics (Fuzzy DL), Answer Set Programming (ASP), rule-based systems and other suitable systems.

The knowledge encoding process may require human expert knowledge for feature identification; however, automated techniques using a machine learning and related techniques may also be adopted for automated feature engineering and extraction.

In an exemplary application, a graph-to-sequence learning method or a graph-based extension to the XNN part of a CNN-XNN system may be utilized to add graph-based processing capabilities to a CNN-XNN, that may make the implementation more amenable for the processing, incorporation, and uptake of human expert knowledge, taxonomical and/or ontological information. It may be further contemplated that such a graph-based extension may also be applied to the convolutional part of a CNN-XNN system, converting it to an explainable Graph Convolutional Network (GCN).

Once all knowledge from the various sources is combined and encoded, an XNN layer may be created or implemented to learn knowledge in an interpretable manner 510. The XNN part may be initialized using a separate process (for example, using a model induction method) in order to determine the partitions and the initial weights for the XNN. Model refinement using the end-to-end network may be applied after the initialization process. The output knowledge within the XNN network may in this way form the foundation for generating the explanations to the user which may be personalized according to the goals and user context.

Finally, an output layer may provide a user with predictions and explanations 512. Exemplary explanations may include a textual description and/or a diagram depicting the segmented organs highlighting the problematic parts, which may include distance from one organ to another, the shape or size, color, or pattern in a specific area, etc.

Another exemplary explanation may apply the reverse indexing mechanism to generate a heatmap or to identify which filters, symbols or concepts are the most important for that specific input. FIG. 4 shows how this may be applied; as provided in FIG. 4, it may be contemplated in one exemplary embodiment that the different level of abstractions between filters, symbols and concepts may be used for generating explanations. Such explanations may be embodied in both software and directly in hardware for mobile systems, robots, edge and/or IoT devices.

In an exemplary embodiment, a CNN-XTT implementation may be used in a multi-media information retrieval and information indexing application requiring processing of text, image, video, 3D scan and audio information to extract the most pertinent information and track multiple events and objects across time and space for the whole corpus being analyzed. Rather than allowing the XTT to figure out a possibly unexplainable transform that replaces the convolutional operation, a set of CNN layers, as in a CNN-XNN implementation is utilized, together with the reverse indexing mechanism (Backmap), to combine the advantages of the attention-driven model within an XTT and the XTT's enhanced predictive and recognition capabilities with the end-to-end white-box explainability afforded via the combination of convolutional layers and Backmap, in a similar manner to CNN-XNN implementations.

In an exemplary embodiment, a CNN-XSN implementation in an autonomous vehicle may be used to process a combination of acceleration, image, 3D, range sensing and other suitable data in real-time using spiking networks rather than conventional neural networks to significantly reduce the resources required, which may be a critical implementation factor that is key in determining the practical viability and application range of such a system. It is further contemplated that a CNN-XSN implementation may adapt and re-train much faster to newly unforeseen and novel inputs than a CNN-XNN implementation or similar, thus enabling practical implementations and deployments of explainable AI in rapidly changing and/or unpredictable environments that may otherwise not be possible.

In an exemplary embodiment, a CNN-XNN implementation in a medical scanning device may utilize links to a behavioral model (BM) and/or a behavioral model hierarchy (BMH) that enables it to react quickly both to the final output and its explanation together with intermediate information available in the CNN-XNN system, such as partially dimensionally reduced data available in the pooling layers and other intermediate layers in the system, possibly in conjunction with the Backmap system. For example, such a BM linked to a CNN-XNN may provide real-time fine-adjustment guidance to a Computer Axial Tomography (CAT) scanner. As a further example, an exemplary BM and CNN-XNN system implemented within a Magnetic Resonance Imaging (MRI) scanner may significantly reduce scanning time by automatically moving the subject that is being scanned forward once enough data for a good enough quality image to be reconstructed has been collected, while simultaneously providing an explanation of why parts of the scanning process could be safely skipped without affecting safety and/or quality of the results.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for providing a convolutional explainable neural network, comprising:
   at least one convolutional layer configured to convolute an input into a plurality of neurons;
   an input layer configured to identify one or more input features;

a conditional network, comprising:
  a conditional layer configured to model the input features based on one or more partitions, wherein each of the one or more partitions comprises a local model of a rule;
  an aggregation layer configured to aggregate one or more rules into one or more of the partitions; and
  a switch output layer configured to selectively pool the aggregated partitions from the aggregation layer with the remaining partitions from the conditional layer;
a prediction network, comprising:
  a feature generation and transformation network comprising one or more transformation neurons configured to apply one or more transformations to the input features;
  a fit layer configured to combine features which have been transformed by the feature generation and transformation network to identify one or more coefficients related to at least one of: one or more features and one or more partitions;
  a value output layer configured to output a value related to at least one of: one or more features, one or more partitions, as applied to the one or more coefficients; and
an output layer configured to present an output which is interpretable and explainable by at least one of a machine program or a human, wherein the output layer presents a global model comprising the one or more local models.

2. The system of claim 1, wherein each partition is explainable and interpretable, such that each local model formed from the partitions is explainable and interpretable, and the global model formed from the combination of local models is explainable and interpretable, and wherein an explanation is formed with the output in a single feed forward step.

3. The system of claim 1, wherein the feature generation and transformation layer is configured to apply at least one of a linear transformation and a non-linear transformation, wherein the transformation functions comprise one or more of polynomial expansions, rotations, dimensional scaling, dimensionless scaling, Fourier transforms, integer/real/complex/quaternion/octonion transforms, Walsh functions, state-space transforms, phase-space transforms, Haar and non-Haar wavelets, generalized L2 functions, fractal-based transforms, Hadamard transforms, Type 1 fuzzy logic, Type 2 fuzzy logic, knowledge graph networks, categorical encoding, difference analysis, normalization, standardization, scaling, multi-dimensional Bezier curves, recurrence relations, causal operators, gradient descent based transformations, and subsets of an explainable neural network.

4. The system of claim 1, wherein the transformation layer is further configured to perform a plurality of transformations in a transformation pipeline, and wherein the transformation pipeline is further configured to perform transformations that analyze one or more temporally ordered data sequences according to the value of one or more variables.

5. The system of claim 1, further comprising at least one of a selection, ranking, split, and merge layer implemented at least one of before, in, and after the conditional network.

6. The system of claim 1, wherein the value output layer is configured to present at least one of a predicted value and a classification label based on the input features, and wherein the value output layer further includes at least one of an activation function, confidence interval information, error range information, bias information, strength and weakness assessment, risk assessment, cause-and-effect information, workflow function, decision function, or executable action.

* * * * *